(12) United States Patent
Mirsky et al.

(10) Patent No.: US 10,063,449 B2
(45) Date of Patent: *Aug. 28, 2018

(54) APPARATUS AND METHOD TO USE PTP TIMESTAMPS FOR ONE-WAY DELAY AND DELAY VARIATION MEASUREMENT IN IP NETWORKS

(71) Applicant: Telefonaktiebolaget L M Ericsson (publ), Stockholm (SE)

(72) Inventors: Gregory Mirsky, Pleasanton, CA (US); Ramanathan Lakshmikanthan, Santa Clara, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 549 days.

This patent is subject to a terminal disclaimer.

(21) Appl. No.: 14/641,138

(22) Filed: Mar. 6, 2015

(65) Prior Publication Data

US 2016/0191367 A1   Jun. 30, 2016

Related U.S. Application Data

(60) Provisional application No. 62/098,937, filed on Dec. 31, 2014.

(51) Int. Cl.
  *G06F 15/16*   (2006.01)
  *H04L 12/26*   (2006.01)
  *H04L 29/08*   (2006.01)
  *H04L 29/06*   (2006.01)

(52) U.S. Cl.
  CPC ........... *H04L 43/106* (2013.01); *H04L 43/50* (2013.01); *H04L 67/141* (2013.01); *H04L 67/42* (2013.01); *H04L 69/24* (2013.01); *H04L 69/28* (2013.01); *H04L 69/16* (2013.01)

(58) Field of Classification Search
  None
  See application file for complete search history.

(56) References Cited

PUBLICATIONS

IEEE 1588-2002: IEEE Standard for a Precision Clock Synchronization Protocol for Networked Measurement and Control Systems, Nov. 8, 2002.

(Continued)

*Primary Examiner* — Esther B Henderson
(74) *Attorney, Agent, or Firm* — Patent Portfolio Builders, PLLC

(57) ABSTRACT

A method is implemented by a network device to establish a one-way active measurement protocol (OWAMP) test session that supports use of a Network Time Protocol (NTP) timestamp format and a Precision Time Protocol Version 2 (PTPv2) timestamp format. The network device acts as a control-client that communicates with a server to establish an OWAMP test session between a sender and a receiver. The method includes receiving a server greeting message from the server indicating timestamp formats that the receiver can interpret, checking whether the receiver supports the multiple timestamp format extensions to OWAMP, configuring the sender to set timestamps in a format that the sender can set and the receiver can interpret if the receiver supports multiple timestamp format extensions to OWAMP, sending an extended set-up-response message to the server indicating a timestamp format that the sender can set and the receiver can interpret, and receiving a server-start message from the server.

12 Claims, 14 Drawing Sheets

(56) References Cited

PUBLICATIONS

RFC 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2119: Bradner, "Key words for use in RFCs to Indicate Requirement Levels," Mar. 1997, 3 pages, Network Working Group, Request for Comments: 2119.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: Moy, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.
RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services," Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments: 2597, The Internet Society.
RFC 2675: Borman, et al., "IPv6 Jumbograms," Aug. 1999, 9 pages, Network Working Group, Request for Comments: 2675, The Internet Society.
RFC 2983: Black, "Differentiated Services and Tunnels," Oct. 2000, 14 pages, Network Working Group, Request for Comments: 2983, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.
RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 Pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.
RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4364: Rosen, et al., "BGP/MPLS IP Virtual Private Networks (VPNs)," Feb. 2006, 47 pages, Network Working Group, Request for Comments: 4364, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.
RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.
RFC 4594: Babiarz, et al., "Configuration Guidelines for DiffServ Service Classes," Aug. 2006, 57 pages, Network Working Group, Request for Comments: 4594, The Internet Society.
RFC 5036: Andersson, et al., "LDP Specification," Oct. 2007, 135 pages, Network Working Group, Request for Comments: 5036, The IETF Trust.
RFC 5340: Coltun, et al., "OSPF for IPv6," Jul. 2008, 94 pages, Network Working Group, Request for Comments: 5340, The IETF Trust.
RFC 5405: Eggert, et al., "Unicast UDP Usage Guidelines for Application Designers," Nov. 2008, 27 pages, Network Working Group, Request for Comments: 5405, IETF Trust and the persons identified as the document authors.
RFC 5618: Morton, et al., "Mixed Security Mode for the Two-Way Active Measurement Protocol (TWAMP)," Aug. 2009, 8 pages, Network Working Group, Request for Comments: 4656, The IETF Trust.
RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
RFC 6038: Morton, et al., "Two-Way Active Measurement Protocol (TWAMP) Reflect Octets and Symmetrical Size Features," Oct. 2010, 18 pages, Network Working Group, Request for Comments: 6038 The IETF Trust.

(56) References Cited

OTHER PUBLICATIONS

"1588-2008 IEEE Standard for a Precision Clock Synchronization Protocol for Networked Measurement and Control Systems", *IEEE*, Mar. 2008.
Hedayat, K., et al., "A Two-Way Active Measurement Protocol (TWAMP)", *RFC 5357*, Oct. 2008.
Mills, D., et al., "Network Time Protocol Version 4: Protocol and Algorithms Specification", *RFC 5905*, Jun. 2010.
Shalunov, S., et al., "A One-way Active Measurement Protocol (OWAMP)", *RFC 4656*, Sep. 2006.

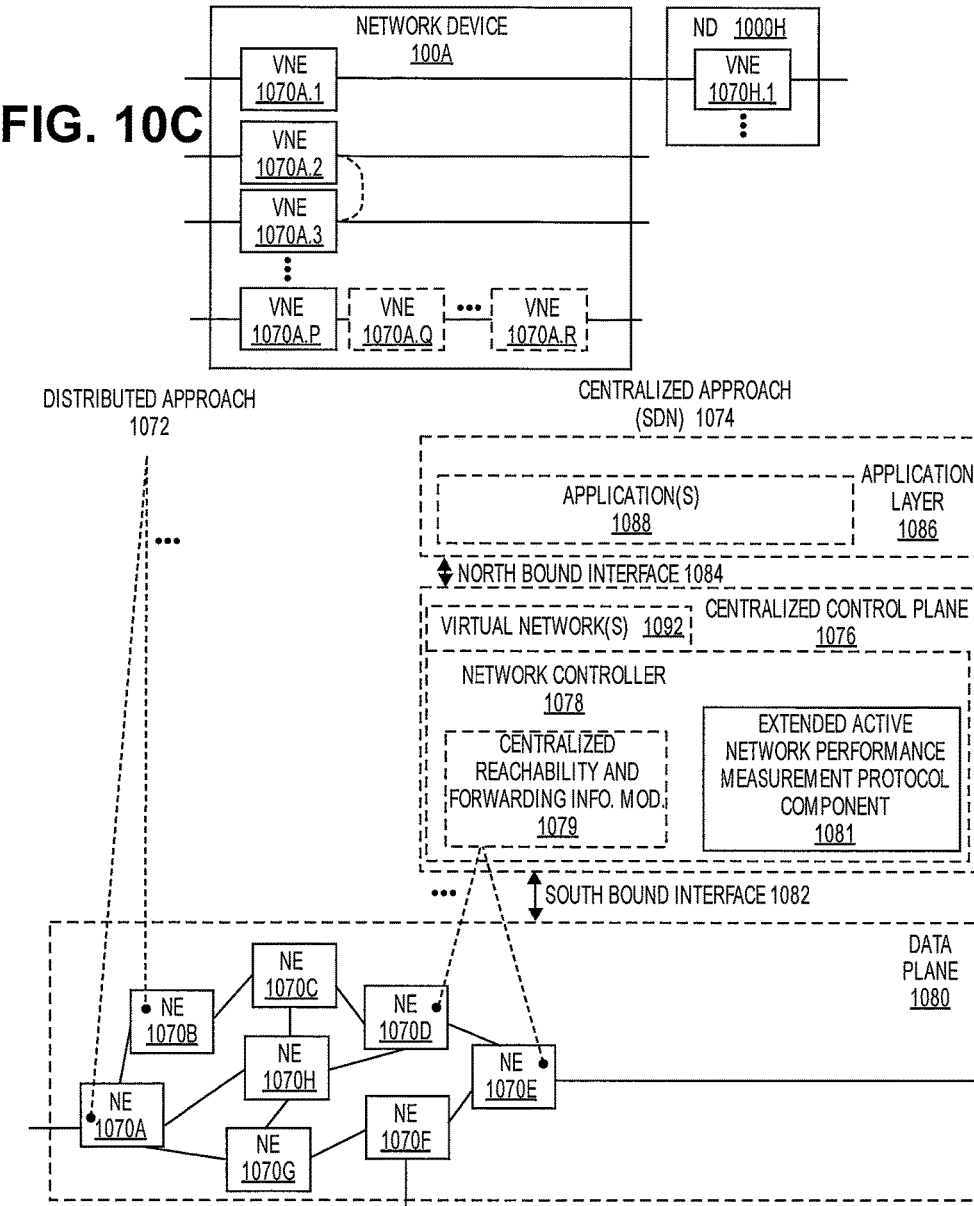
FIG. 10C
FIG. 10D
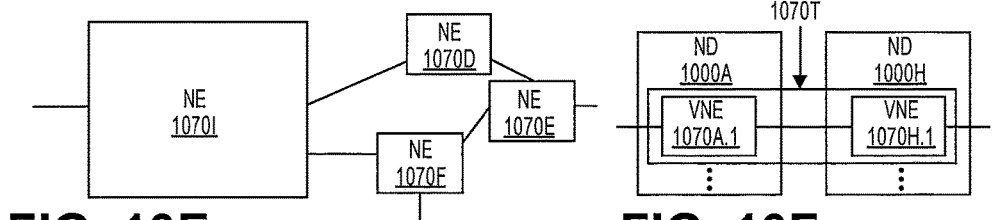
FIG. 10E
FIG. 10F

APPARATUS AND METHOD TO USE PTP TIMESTAMPS FOR ONE-WAY DELAY AND DELAY VARIATION MEASUREMENT IN IP NETWORKS

CROSS REFERENCE TO RELATED APPLICATIONS

The present application claims the benefit of U.S. Provisional Patent Application No. 62/098,937, filed on Dec. 31, 2014, which is hereby incorporated by reference. Cross-reference is made to a co-pending application entitled "Apparatus and Method to Use PTP Timestamp for Two-Way Delay and Delay Variation Measurement in IP Networks" filed on the same date as the present application and commonly owned. The cross-referenced application is incorporated herein by reference.

FIELD

Embodiments of the invention relate to the field of network performance measurement. More specifically, the embodiments relate to extending active network performance measurement protocols to support multiple timestamp formats.

BACKGROUND

One-Way Active Measurement Protocol (OWAMP) is a protocol used for measuring one-way performance metrics in a network. For example, OWAMP may be used to measure one-way delay and delay variation in Internet Protocol (IP) networks. OWAMP is defined in RFC 4656.

Two-Way Active Measurement Protocol (TWAMP) is a protocol used for measuring one-way and two-way or round-trip performance metrics in a network. For example, TWAMP may be used to measure one-way and two-way or roundtrip delay and delay variation in IP networks. TWAMP is defined in RFC 5357.

OWAMP and TWAMP rely on timestamps inserted into test packets for measuring network performance. Current OWAMP and TWAMP specifications require the use of the Network Time Protocol (NTP) timestamp format. Precision Time Protocol (PTP), which is defined in IEEE 1588-2008, has gained wide support since the original development of OWAMP and TWAMP. Many hosts now support PTP in the fast forwarding engine. For these hosts to support OWAMP and TWAMP, they must convert timestamps from PTP format to NTP format. This requires the use of extra resources, micro-code, or additional processing elements, which adds extra cost and complexity. The added cost and complexity may adversely affect the consistency and accuracy of delay measurements.

SUMMARY

A method is implemented by a network device to establish a one-way active measurement protocol (OWAMP) test session that supports use of a Network Time Protocol (NTP) timestamp format and a Precision Time Protocol Version 2 (PTPv2) timestamp format. The network device acts as a control-client that communicates with a server to establish an OWAMP test session between a session-sender and a session-receiver. The method opens a transmission control protocol (TCP) connection to the server and receives a server greeting message from the server, where the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP. The method checks whether the session-receiver supports the multiple timestamp format extensions to OWAMP, configures the session-sender to set timestamps using a timestamp format that the session-sender can set and the session-receiver can interpret in response to determining that the session-receiver supports the multiple timestamp format extensions to OWAMP, sends an extended set-up-response message to the server in response to determining that the session-receiver supports the multiple timestamp format extensions to OWAMP, where the extended set-up-response message includes an indication of a timestamp format that the session-sender can set and the session-receiver can interpret, and receives a server-start message from the server.

A method is implemented by a network device to to establish a one-way active measurement protocol (OWAMP) test session that supports use of a Network Time Protocol (NTP) timestamp format and a Precision Time Protocol Version 2 (PTPv2) timestamp format. The network device acts as a server that communicates with a control-client to establish an OWAMP test session between a session-sender and a session-receiver. The method receives a transmission control protocol (TCP) connection request from the control-client and sends a server greeting message to the control-client, where the server greeting message includes an indication of whether the session-receiver is capable of interpreting timestamps in the NTP timestamp format and an indication of whether the session-receiver is capable of interpreting timestamps in the PTPv2 timestamp format. The method receives a set-up-response message from the control-client, where the set-up-response message includes an indication of a timestamp format that the session-sender can set and the session-receiver can interpret where the session-sender supports multiple timestamp format extensions to OWAMP. The method checks whether the session-sender supports the multiple timestamp format extensions to OWAMP, determines that the session-sender will set timestamps using a timestamp format indicated by the received set-up-response message in response to determining that the session-sender supports the multiple timestamp format extensions to OWAMP, and sends a server-start message to the control-client.

A network device is configured to establish a one-way active measurement protocol (OWAMP) test session that supports use of a Network Time Protocol (NTP) timestamp format and a Precision Time Protocol Version 2 (PTPv2) timestamp format. The network device acts as a control-client that communicates with a server to establish an OWAMP test session between a session-sender and a session-receiver. The network device includes a non-transitory machine readable medium to store an extended active network performance measurement protocol component. The network device also includes a processor that is communicatively coupled to the non-transitory machine readable medium. The processor is configured to execute the extended active network performance measurement protocol component. The extended active network performance measurement protocol component is configured to open a transmission control protocol (TCP) connection to the server, receive a server greeting message from the server, where the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP, check whether the session-receiver supports the multiple timestamp format extensions to OWAMP, configure the session-sender to set timestamps using a timestamp format that the session-sender can set and the session-receiver can interpret in response to determining that the session-receiver supports the multiple timestamp format extensions to OWAMP, send an extended set-up-response message to the server in response to determining that the session-receiver supports the multiple timestamp format extensions to OWAMP, where the extended set-up-response message includes an indication of a timestamp format that the session-sender can set and the session-receiver can interpret, and receive a server-start message from the server.

A network device is configured to establish a one-way active measurement protocol (OWAMP) test session that supports use of a Network Time Protocol (NTP) timestamp format and a Precision Time Protocol Version 2 (PTPv2) timestamp format. The network device acts as a server that communicates with a control-client to establish an OWAMP test session between a session-sender and a session-receiver. The network device includes a non-transitory machine readable medium to store an extended active network performance measurement protocol component. The network device also includes a processor that is communicatively coupled to the non-transitory machine readable medium. The processor is configured to execute the extended active network performance measurement protocol component. The extended active network performance measurement protocol component is configured to receive a transmission control protocol (TCP) connection request from the control-client, send a server greeting message to the control-client, where the server greeting message includes an indication of whether the session-receiver is capable of interpreting timestamps in the NTP timestamp format and an indication of whether the session-receiver is capable of interpreting timestamps in the PTPv2 timestamp format, receive a set-up-response message from the control-client, where the set-up-response message includes an indication of a timestamp format that the session-sender can set and the session-receiver can interpret where the session-sender supports multiple timestamp format extensions to OWAMP, check whether the session-sender supports the multiple timestamp format extensions to OWAMP, determine that the session-sender will set timestamps using a timestamp format indicated by the received set-up-response message in response to determining that the session-sender supports the multiple timestamp format extensions to OWAMP, and send a server-start message to the control-client.

A non-transitory machine readable storage medium has stored therein instructions to be executed by a network device to establish a one-way active measurement protocol (OWAMP) test session that supports use of a Network Time Protocol (NTP) timestamp format and a Precision Time Protocol Version 2 (PTPv2) timestamp format. The network device acts as a control-client that communicates with a server to establish an OWAMP test session between a session-sender and a session-receiver. The instructions cause the network device to perform a set of operations including, opening a transmission control protocol (TCP) connection to the server, receiving a server greeting message from the server, where the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP, checking whether the session-receiver supports the multiple timestamp format extensions to OWAMP, configuring the session-sender to set timestamps using a timestamp format that the session-sender can set and the session-receiver can interpret in response to determining that the session-receiver supports the multiple timestamp format extensions to OWAMP, sending an extended set-up-response message to the server in response to determining that the session-receiver supports the multiple timestamp format extensions to OWAMP, where the extended set-up-response message includes an indication of a timestamp format that the session-sender can set and the session-receiver can interpret, and receiving a server-start message from the server.

A non-transitory machine readable storage medium has stored therein instructions to be executed by a network device to establish a one-way active measurement protocol (OWAMP) test session that supports use of a Network Time Protocol (NTP) timestamp format and a Precision Time Protocol Version 2 (PTPv2) timestamp format. The network device acts as a server that communicates with a control-client to establish an OWAMP test session between a session-sender and a session-receiver. The instructions cause the network device to perform a set of operations including, receiving a transmission control protocol (TCP) connection request from the control-client, sending a server greeting message to the control-client, where the server greeting message includes an indication of whether the session-receiver is capable of interpreting timestamps in the NTP timestamp format and an indication of whether the session-receiver is capable of interpreting timestamps in the PTPv2 timestamp format, receiving a set-up-response message from the control-client, where the set-up-response message includes an indication of a timestamp format that the session-sender can set and the session-receiver can interpret where the session-sender supports multiple timestamp format extensions to OWAMP, checking whether the session-sender supports the multiple timestamp format extensions to OWAMP, determining that the session-sender will set timestamps using a timestamp format indicated by the received set-up-response message in response to determining that the session-sender supports the multiple timestamp format extensions to OWAMP, and sending a server-start message to the control-client.

A computing device implements a plurality of virtual machines for implementing network function virtualization (NFV), where a virtual machine from the plurality of virtual machines is configured to establish a one-way active measurement protocol (OWAMP) test session that supports use of a Network Time Protocol (NTP) timestamp format and a Precision Time Protocol Version 2 (PTPv2) timestamp format. The virtual machine implements functionality that causes the computing device to act as a control-client that communicates with a server to establish an OWAMP test session between a session-sender and a session-receiver. The computing device includes a storage medium to store an extended active network performance measurement protocol component and a processor communicatively coupled to the storage medium. The processor is configured to execute the virtual machine, where the virtual machine is configured to implement the extended active network performance measurement protocol component. The extended active network performance measurement protocol component is configured to open a transmission control protocol (TCP) connection to the server, receive a server greeting message from the server, where the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP, check whether the session-receiver supports the multiple timestamp format extensions to OWAMP, configure the session-sender to set timestamps using a timestamp format that the session-sender can set and the session-receiver can interpret in response to determining that the session-receiver supports the multiple timestamp format extensions to OWAMP, send an extended set-up-response message to the server in response to determining that the session-receiver supports the multiple timestamp format extensions to OWAMP, wherein the extended set-up-response message includes an indication of a timestamp format that the session-sender can set and the session-receiver can interpret, and receive a server-start message from the server.

A computing device implements a plurality of virtual machines for implementing network function virtualization (NFV), where a virtual machine from the plurality of virtual machines is configured to establish a one-way active measurement protocol (OWAMP) test session that supports use of a Network Time Protocol (NTP) timestamp format and a Precision Time Protocol Version 2 (PTPv2) timestamp format. The virtual machine implements functionality that causes the computing device to act as a server that communicates with a control-client to establish an OWAMP test session between a session-sender and a session-receiver. The computing device includes a storage medium to store an extended active network performance measurement protocol component and a processor communicatively coupled to the storage medium. The processor is configured to execute the virtual machine, where the virtual machine is configured to implement the extended active network performance measurement protocol component. The extended active network performance measurement protocol component is configured to receive a transmission control protocol (TCP) connection request from the control-client, send a server greeting message to the control-client, where the server greeting message includes an indication of whether the session-receiver is capable of interpreting timestamps in the NTP timestamp format and an indication of whether the session-receiver is capable of interpreting timestamps in the PTPv2 timestamp format, receive a set-up-response message from the control-client, where the set-up-response message includes an indication of a timestamp format that the session-sender can set and the session-receiver can interpret where the session-sender supports multiple timestamp format extensions to OWAMP, check whether the session-sender supports the multiple timestamp format extensions to OWAMP, determine that the session-sender will set timestamps using a timestamp format indicated by the received set-up-response message in response to determining that the session-sender supports the multiple timestamp format extensions to OWAMP, and send a server-start message to the control-client.

BRIEF DESCRIPTION OF THE DRAWINGS

The invention may best be understood by referring to the following description and accompanying drawings that are used to illustrate embodiments of the invention. In the drawings:

FIG. 10C illustrates various exemplary ways in which virtual network elements (VNEs) may be coupled according to some embodiments of the invention;

FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention;

FIG. 10E illustrates the simple case of where each of the NDs implements a single NE, but a centralized control plane has abstracted multiple of the NEs in different NDs into (to represent) a single NE in one of the virtual network(s), according to some embodiments of the invention;

FIG. 10F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
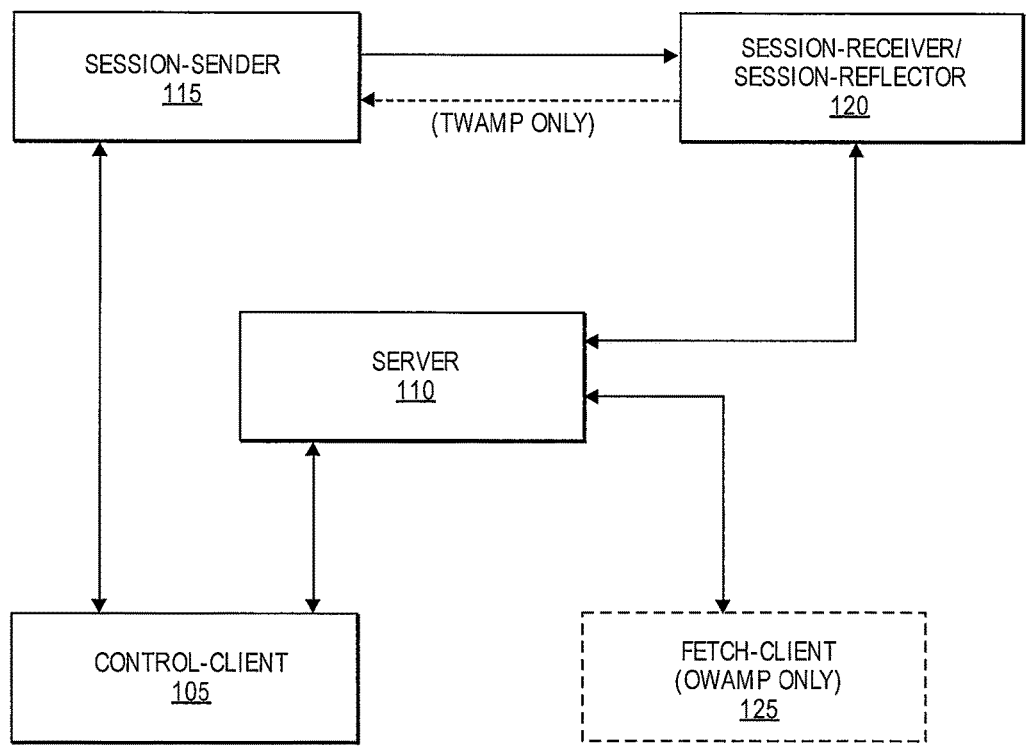
FIG. 1 is a block diagram illustrating one embodiment of a system for performing an active network performance measurement that supports multiple timestamp formats.

The following description describes methods and apparatus for supporting the use of multiple timestamp formats in active network performance measurement protocols. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

One-Way Active Measurement Protocol (OWAMP) provides capabilities for measuring one-way performance metrics over Internet Protocol (IP) networks. OWAMP consists of a control protocol and a test protocol that can be used to measure performance metrics for one-way transmissions of test packets over network segments. The OWAMP control protocol (i.e., OWAMP-Control) is used to initiate, start, and stop test sessions and to fetch their results. The OWAMP test protocol (i.e., OWAMP-Test) is used to exchange test packets between two measurement nodes. OWAMP employs timestamps at a sending node and a receiving node to calculate performance metrics. Current OWAMP specifications require the use of the Network Time Protocol (NTP) timestamp format in OWAMP test packets. The NTP timestamp format uses 64 bits. The first 32 bits represent the unsigned integer number of seconds elapsed since 0 h on Jan. 1, 1900. The next 32 bits represent the fractional part of a second that has elapsed since then. OWAMP is further described in RFC 4656, which is hereby incorporated by reference.

Two-Way Active Measurement Protocol (TWAMP) provides capabilities for measuring one-way and two-way or roundtrip performance metrics over IP networks. TWAMP consists of a control protocol and a test protocol that can be used to measure performance metrics for one-way and two-way transmissions of test packets over network segments. The TWAMP control protocol (i.e., TWAMP-Control) is used to initiate, start, and stop test sessions. The TWAMP test protocol (i.e., TWAMP-Test) is used to exchange test packets between two measurement nodes. TWAMP employs timestamps applied at a sending node and a reflecting node to calculate performance metrics. Similar to OWAMP, current TWAMP specifications require the use of the NTP timestamp format in TWAMP test packets. TWAMP is further described in RFC 5357, which is hereby incorporated by reference.

The Precision Time Protocol (PTP), which is defined in IEEE-1588, has gained wide support since the development of OWAMP and TWAMP. PTP is now supported in the fast forwarding engine of many network devices. As a result, network devices that utilize PTP for time synchronization need to convert timestamps from PTP to NTP in order to support OWAMP or TWAMP protocols. This conversion requires consumption of valuable computing resources, use of micro-code, or additional processing elements, which are usually limited. Since the fields reserved for timestamp in OWAMP and TWAMP test packets are 64 bits long, embodiments will use IEEE 1588v2 PTP timestamp format in its truncated form, which is the same as IEEE 1588v1 timestamp format. The truncated IEEE 1588v2 PTP timestamp format uses 64 bits, including a 32-bit seconds field and a 32-bit nanoseconds field. The truncated IEEE 1588v2 PTP timestamp format will be referred to herein as the PTPv2 timestamp format or the IEEE 1588v2 PTP timestamp format.

The embodiments of the invention described herein below overcome the disadvantages of the prior art by augmenting existing active network performance measurement protocols (e.g., OWAMP and TWAMP) to support multiple timestamp formats (e.g., NTP timestamp format and IEEE 1588v2 PTP timestamp format) without affecting the accuracy and consistency of network performance measurement. Further the embodiments augment active network performance measurement protocols in a way that allows for the augmented protocols to work with non-augmented protocols. This supports a gradual upgrade scenario where hosts that support the augmented protocols can peer with hosts that use the traditional non-augmented protocols in a test session.

Current OWAMP and TWAMP specifications require the use of NTP timestamp format. Embodiments extend OWAMP and TWAMP to allow for the use of PTPv2 timestamp format. Embodiments allow for the use of multiple timestamp formats by announcing the timestamp format(s) supported by the session-sender and/or session-receiver/reflector and arriving at a consistent decision on which timestamp format to use. Various embodiments will be described herein below in additional detail. For simplicity and clarity, the various embodiments primarily describe extending OWAMP or TWAMP to support multiple timestamp formats. However, one having ordinary skill in the art will appreciate that other types of active network performance measurement protocols can be extended in a similar fashion to support multiple timestamp formats. Also, while the embodiments described below primarily discuss supporting NTP timestamp format and PTPv2 timestamp format, one having ordinary skill in the art will appreciate that active network performance measurement protocols can be extended to support other types of timestamp formats as well.

FIG. 1 is a block diagram illustrating one embodiment of a system for performing an active network performance measurement that supports multiple timestamp formats. As shown in FIG. 1, the system may include a control-client 105, a server 110, a session-sender 115, a session-receiver/reflector 120, and in some embodiments, a fetch client 125. The arrows connecting the entities shown in FIG. 1 represent communications between the entities. In one embodiment, communications between the entities may be performed using OWAMP and/or TWAMP protocols. Further, communications between the entities can be extended in any of the ways described below to support multiple timestamp formats.

Each of the entities shown in FIG. 1 will be described below in additional detail.

Control-Client: The control-client 105 is capable of initiating requests for OWAMP-Test sessions and/or TWAMP-Test sessions. The control-client 150 may trigger the start of a set of sessions and also may trigger their termination. More specifically, the control-client 105 may issue Request-Session, Start-Sessions, and Stop-Sessions commands to initiate, start, and terminate test sessions, respectively. Accordingly, a user may control test sessions by providing instructions to the control-client 105 using any known access device(s) and/or interface(s). As shown in FIG. 1, the control-client 105 may communicate with the session-sender 115 and the session-receiver/reflector 120 through the server 110. The control-client 105 may also communicate with the session-sender 115 directly without going through the server 110.

Server: The server 110 is capable of managing one or more performance test sessions, including test sessions between the session-sender 115 and the session-receiver/reflector 120. The server 110 is also capable of configuring per-session state in session endpoints and returning the results of a test session. A user may use the control-client 105 to access the functionality of the server 110 to conduct, manage, and/or analyze test sessions between the session-sender 115 and the session-receiver/reflector 120.

Session-Sender: The session-sender 115 is capable of acting as the sending endpoint of an OWAMP-Test session or a TWAMP-Test session. The session-sender 115 may transmit streams of test packets to the session-receiver/reflector 120. The test packets transmitted from the session-sender 115 to the session-receiver/reflector 120 are referred to herein as sender test packets. The session-sender 115 may include any suitable data into the sender test packets, including timestamp data. In TWAMP, the session-reflector 120 may be configured to respond to every timely received and valid sender test packet by transmitting a response test packet to the session-sender 115. The test packets transmitted from the session-reflector 120 to the session-sender 115 are referred to herein as response test packets. In one embodiment, the session-sender 115 is capable of receiving and processing response test packets. The session-sender 115 may extract data from the response test packets and use the data to compute performance metrics, including two-way and/or one-way performance metrics. In one embodiment, timestamps contained in the response test packet are used to compute delay and or delay variation metrics. The session-sender 115 may then make extracted data and/or the calculated performance metrics accessible to the server 110 and/or the control-client 105.

Session-Receiver/Reflector: The session-receiver/reflector 120 is capable of acting as the receiving endpoint of an OWAMP-Test session or a TWAMP-Test session. In OWAMP, this entity is called the session-receiver. In OWAMP, the session-receiver 120 may extract data from the received sender packets to compute one-way performance metrics. In TWAMP, this entity is called the session-reflector. As discussed above, in TWAMP, the session-reflector 120 may send a response test packet to the session-sender 115 for every valid and timely received sender test packet. The session-reflector 120 may include any suitable data into the response test packets, including timestamp data.

Fetch-Client: The fetch-client 125 is capable of initiating requests to fetch the results of completed OWAMP-Test sessions. The fetch client is not needed in TWAMP.

Figure 2:
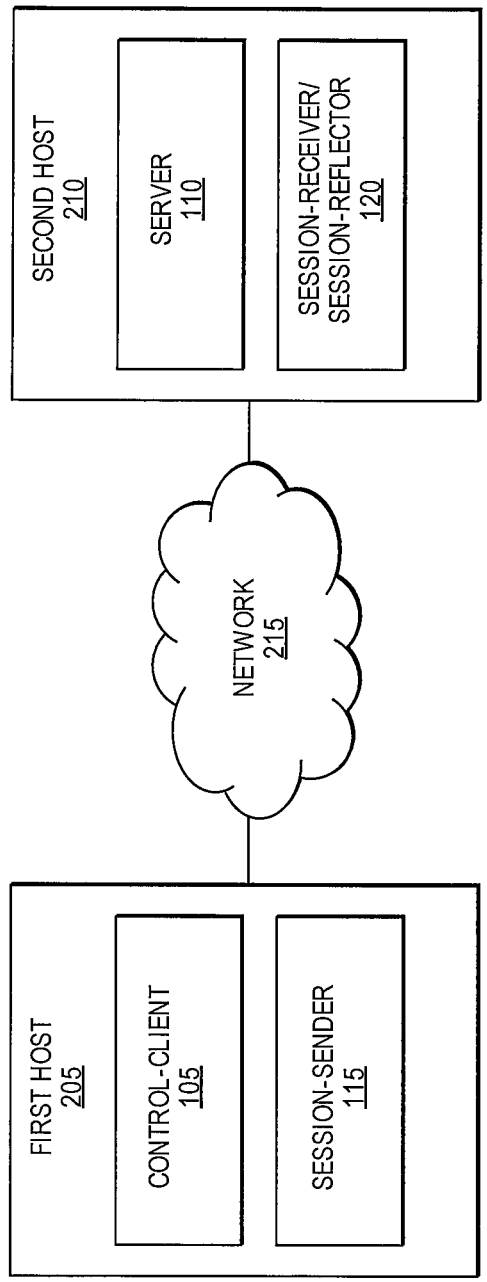
FIG. 2 is a block diagram illustrating one embodiment of a system for performing an active network performance measurement that supports multiple timestamp formats, implemented with two hosts.

FIG. 2 is a block diagram illustrating one embodiment of a system for performing an active network performance measurement that supports multiple timestamp formats, implemented with two hosts. The system of FIG. 1 may be implemented in a variety of different hardware configurations to measure network performance. In one embodiment, as shown in FIG. 2, different logical entities can be implemented in the same host. In a typical configuration, for example, the control-client 105 and session-sender 115 are implemented on a first host 205, while the server 110 and the session-receiver 120 are implemented on a second host 210. The first host 205 and second host 210 may communicate with each other over any suitable network and using any suitable communication protocols. For simplicity and clarity, various embodiments will be described primarily with reference to the two-host system configuration illustrated in FIG. 2. However, one having ordinary skill in the art will appreciate that embodiments can be implemented using other system configurations such as the configuration illustrated in FIG. 1.

Figure 3:
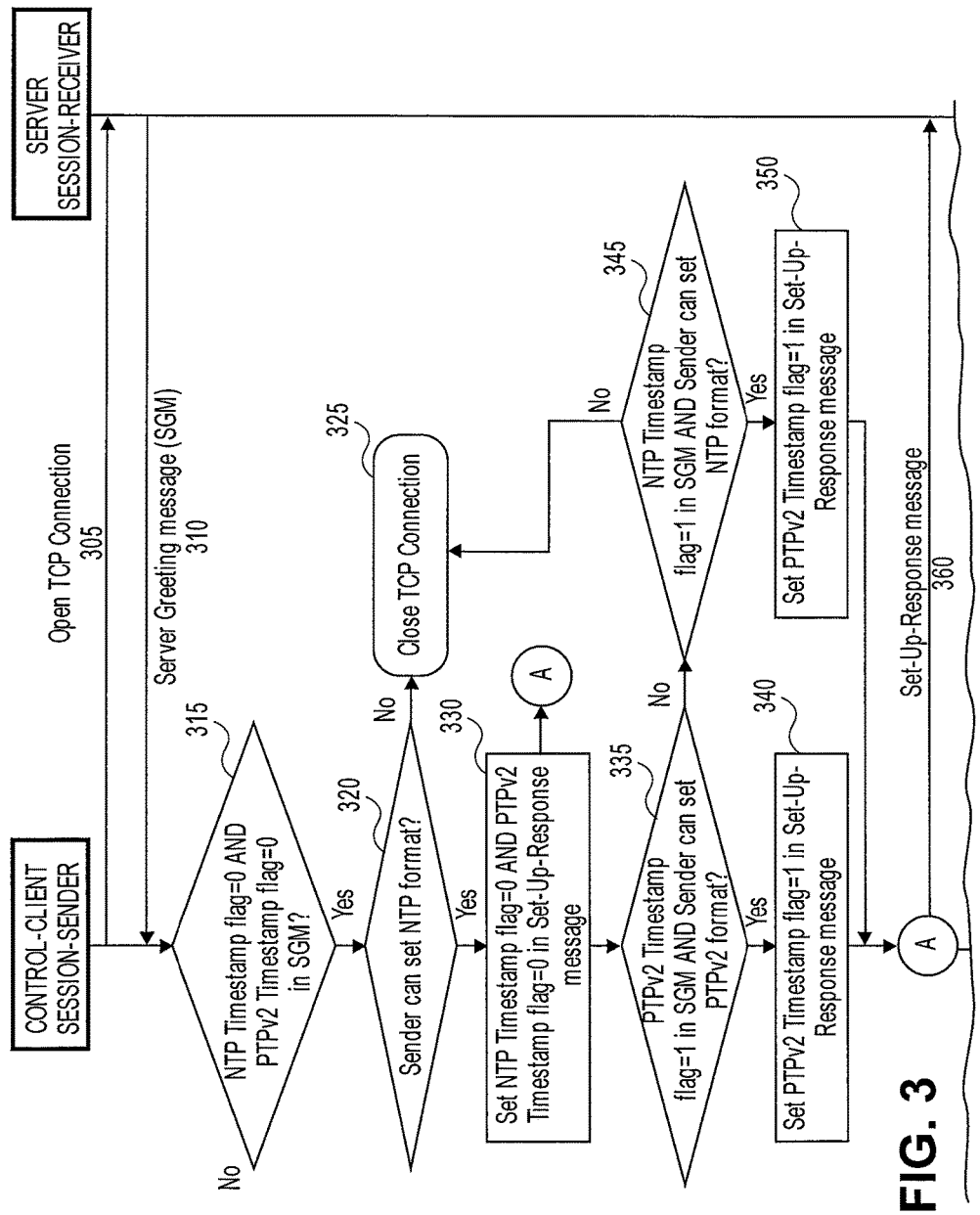
FIG. 3 is a transactional diagram showing OWAMP-Control and OWAMP-Test messages exchanged between a control-client/session-sender and a server/session-receiver for establishing and conducting a one-way active network performance measurement test session that supports multiple timestamp formats.
Figure 3:
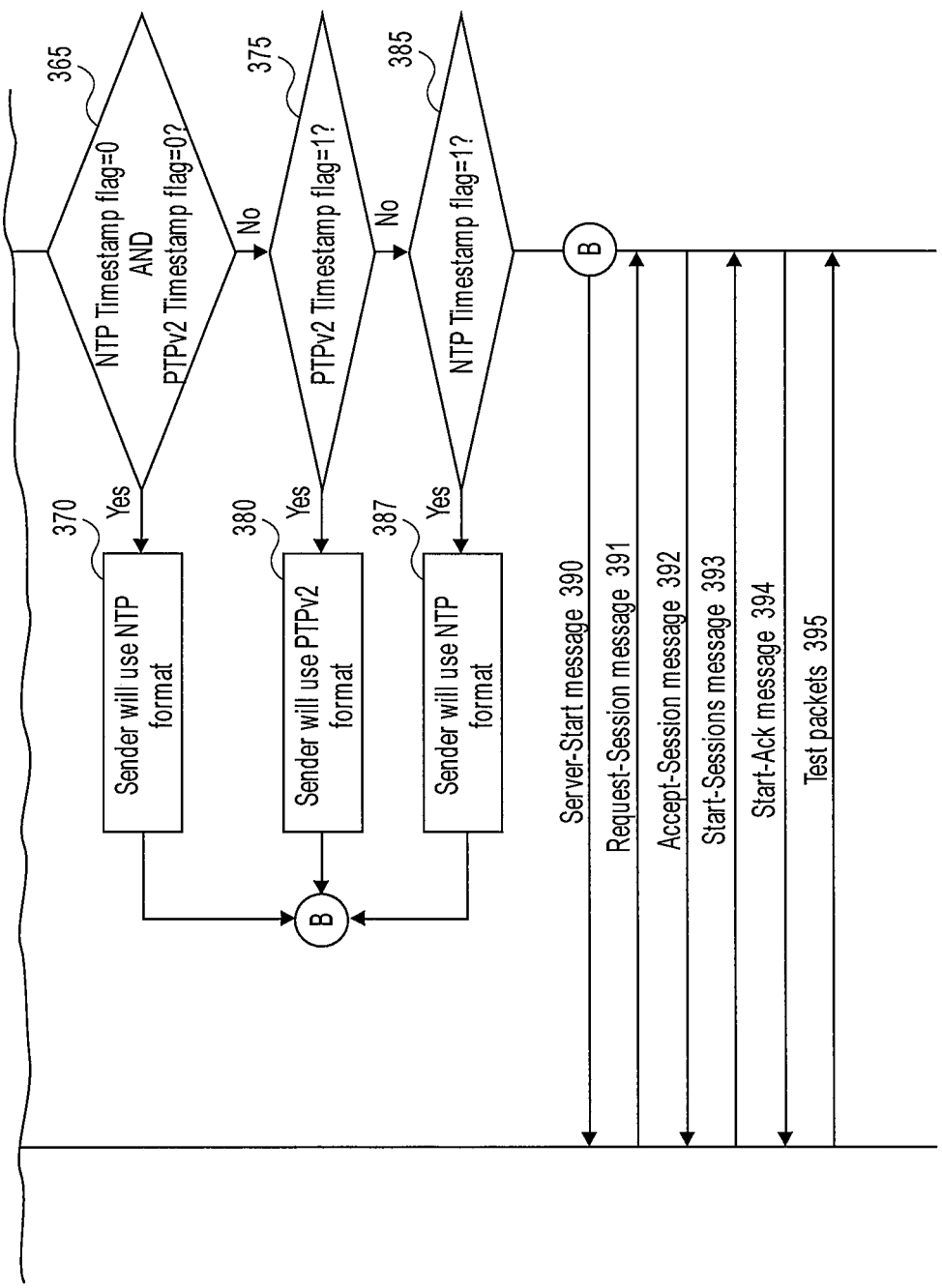

FIG. 3 is a transactional diagram showing OWAMP-Control and OWAMP-Test messages exchanged between a control-client/session-sender and a server/session-receiver for establishing and conducting a one-way active network performance measurement test session that supports multiple timestamp formats. The operations in the transactional diagram will be described with reference to the exemplary embodiments of the other figures. However, it should be understood that the operations of the transactional diagrams can be performed by embodiments of the invention other than those discussed with reference to the other figures, and the embodiments of the invention discussed with reference to these other figures can perform operations different than those discussed with reference to the transactional diagrams.

In one embodiment, the control-client initiates the OWAMP-Control protocol by opening a Transmission Control Protocol (TCP) connection to the server (305) on a previously agreed port number on which the server is listening. For example, the Internet Assigned Numbers Authority (IRNA) has allocated TCP port number 861 for the OWAMP-Control portion of OWAMP. One having ordinary skill in the art will appreciate that other previously agreed upon port numbers (i.e., other than 861) can be used to establish a TCP connection to the server.

The server responds to the control-client with a Server Greeting message (310). In OWAMP-Test, the session-receiver and/or fetch client interprets collected timestamps. Thus, in one embodiment, the server indicates within the Server Greeting Message the timestamp formats that the session-receiver can interpret. In one embodiment, the session-receiver uses the Modes field of the Server Greeting message to indicate the timestamp formats that the session-receiver can interpret. The Modes field in the Server Greeting message includes bits that are used to identify specific communication capabilities. At the same time, the Modes field includes unused bits that are available for protocol extensions. In an embodiment that supports two types of timestamp formats (e.g., NTP format and PTPv2 format), two different bits within the Modes field of the Server Greeting message are used to indicate which timestamp formats the session-receiver can interpret. For example, the Modes field can include a bit to indicate whether the session-receiver can interpret NTP timestamp format. The bit that indicates whether the session-receiver can interpret NTP timestamp format will be referred to herein as the NTP Timestamp flag. Similarly, the Modes field can include a bit to indicate whether the session-receiver can interpret PTPv2 timestamp format. The bit that indicates whether the session-receiver can interpret PTPv2 timestamp format will be referred to herein as the PTPv2 Timestamp flag. One having ordinary skill in the art will appreciate that other bit positions within the Server Greeting message may be used for the NTP Timestamp flag and PTPv2 Timestamp flag. In one embodiment, if the session-receiver supports the multiple timestamp format extension described herein, then the server must be capable of interpreting both NTP timestamp format and PTPv2 timestamp format. Thus, a session-receiver that supports the multiple timestamp format extension will set both the NTP Timestamp flag and the PTPv2 Timestamp flag to have a value of 1 in the Server Greeting message. If the session-receiver does not support the extension, then both the NTP Timestamp flag and the PTPv2 Timestamp flag are expected to have a value of 0 because it is in the Must Be Zero field.

The control-client receives the Server Greeting message and inspects the values set by the server in the Server Greeting message. In one embodiment, if both the NTP Timestamp flag and PTPv2 Timestamp flag of the received Server Greeting message have a value of 0 (decision block 315), then this indicates that the session-receiver does not support the multiple timestamp format extension. As such, the session-sender should use NTP timestamp format in the test session. If the session-sender cannot set timestamps in NTP format (decision block 320), then the control-client should close the TCP connection associated with the OWAMP-Control session (block 325). Otherwise, if the session-sender can set timestamps in NTP format (decision block 320), then the control-client sets both the NTP Timestamp flag and PTPv2 Timestamp flag in the Set-Up-Response message to have a value of 0 (block 330) in accordance with traditional OWAMP described in RFC 4656 and the session-sender must use NTP timestamp format. The control-client then sends this Set-Up-Response message to the server (360).

Returning to decision block 315, if both the NTP Timestamp flag and PTPv2 Timestamp flag of the received Server Greeting message do not have a value of 0 (i.e., at least one of the flags has a value of 1), then this indicates that the session-receiver supports the multiple timestamp format extension. If the PTPv2 Timestamp flag in the Server Greeting message has a value of 1 (indicating that the session-receiver can interpret PTPv2 timestamp format) and the session-sender can set timestamps in PTPv2 format (decision block 335), then the session-sender must set timestamps in PTPv2 format. Accordingly, the control-client sets the PTPv2 Timestamp flag in the Set-Up-Response message to have a value of 1 (block 340) to indicate to the server/session-receiver that the session-sender will set timestamps in PTPv2 timestamp format. In a typical scenario, a session-receiver that supports the multiple timestamp format extension is capable of interpreting both NTP timestamp format and PTPv2 timestamp format. Thus, in such a scenario, if the session-sender can set timestamps in PTPv2 format, then the session-sender must set timestamps in PTPv2 format. In one embodiment, if the control-client sets the PTPv2 Timestamp flag in the Set-Up-Response message to have a value of 1, then it must set the NTP Timestamp flag in the Set-Up-Response message to have a value of 0. If the session-sender cannot set timestamps in PTPv2 format, then the control-client sets the PTPv2 Timestamp flag in the Set-Up-Response message to have a value of 0.

Returning to decision block 335, if the session-receiver cannot interpret PTPv2 timestamp format or session-sender cannot set timestamps in PTPv2 format, then the control-client checks whether the NTP Timestamp flag in the Server Greeting message has a value of 1 (indicating that the session-receiver can interpret NTP timestamp format) and the session-sender can set timestamps in NTP format (decision block 345). If so, the session-sender must set timestamps in NTP format. Accordingly, the control-client sets the NTP Timestamp flag in the Set-Up-Response message to have a value of 1 (block 350) to indicate to the server/session-receiver that the session-sender will set timestamps in NTP timestamp format. In a typical scenario, a session-receiver that supports the multiple timestamp format extension is capable of interpreting both NTP timestamp format and PTPv2 timestamp format. Thus, in such a scenario, if the session-sender can set timestamps in NTP format, then the session-sender must set timestamps in NTP format. If the session-sender cannot set timestamps in NTP format (decision block 345), then the control-client should close the TCP connection associated with the OWAMP-Control session (block 325).

The control-client then sends the Set-Up-Response message (360) to the server and the server can inspect the values set by the control-client in the Set-Up-Response message to determine the timestamp format that the session-sender will use in test packets. For example, if both the NTP Timestamp flag and PTPv2 Timestamp flag of the received Set-Up-Response message have a value of 0 (decision block 365), then this means that the session-sender will set timestamps using NTP format (block 370). This situation can occur, for example, if the session-sender does not support the multiple timestamp format extension. If the PTPv2 Timestamp flag of the received Set-Up-Response has a value of 1 (decision block 375), then this means that the session-sender will set timestamps using PTPv2 format (block 380). If the NTP Timestamp flag has a value of 1 in the received Set-Up-Response message (decision block 385), then this means that the session-sender will set timestamps using NTP format (block 387).

In one embodiment, if OWAMP-Control uses Fetch-Session commands, then selection and use of timestamp format is a local decision for both the session-sender and the session-receiver.

Once the server determines the timestamp format that the session-sender will use, the server responds with a Server-Start message (390). The Server Greeting message, Set-Up-Response message, and Server-Start message constitute the connection setup phase of OWAMP-Control. As a result of the connection setup phase described above, the session-sender will choose to use a timestamp format that the session-receiver is capable of interpreting. Moreover, the connection setup phase described above allows the entities to consistently decide on which timestamp format to use even if one of the endpoints (i.e., session-sender or session-receiver) does not support the multiple timestamp format extensions. This allows for the gradual release of the extension without requiring all of the hosts to upgrade to the extension together.

Following the connection setup phase, the control-client can create a one-way active network performance measurement test session by issuing a Request-Session message (391) to the server. The Request-Session message may include the IP address and port number of the session-sender and the session receiver. Also, the Request-Session message may include a schedule for sending test packets. The server then must respond to the Request-Session message with an Accept-Session message (392). The Accept-Session message may accept a request or refuse a request. If the control-client receives an affirmative Accept-Session message from the server, the control-client may start the execution of the requested test session by sending a Start-Sessions message (393) to the server. The server must respond with a Start-Ack message (394), which should be sent as quickly as possible.

Once the Start-Sessions message and Start-Ack messages have been exchanged between the control-client and the server, the session-sender is ready to start sending test packets (395) to the session-receiver using the OWAMP-Test protocol. The OWAMP-Test protocol runs over User Datagram Protocol (UDP) and uses session-sender and session-receiver IP address and port numbers negotiated during the Request-Session message exchange. The session-sender sends a stream of test packets to the session-receiver according to the schedule specified in the Request-Session message. The session-receiver timestamps received test packets and stores information regarding the packet such as sequence number, send time, receive time, and other types of information regarding the test packet that can be used for calculating network performance metrics.

In one embodiment, just prior to sending the test packet to the session-receiver, the session-sender inserts a timestamp in a timestamp field of the test packet. The session-receiver can use the timestamp inserted by the session-sender to calculate delay and/or delay variation metrics. In one embodiment, the session-sender can insert a timestamp using the timestamp format chosen during OWAMP-Control, as described herein above. The session-sender may also indicate which timestamp format is being used in the test packet itself. In one embodiment, the Z field in the Error Estimate field of the test packet is used to indicate the timestamp format being used. For example, a value of 0 in the Z field may indicate that NTP timestamp format is being used and a value of 1 in the Z field may indicate that PTPv2 timestamp format is being used. The use of the Z field should not affect the error estimate or the synchronization information provided in the Error Estimate field. As such, the Error Estimate field can still be used to calculate delay and delay variation metrics. One having ordinary skill in the art will appreciate that other available bits (other than the bit in the Z field) within the test packet can be used to indicate the timestamp format being used.

As a result of the process described above, multiple timestamp formats (e.g., NTP timestamp format and PTPv2 timestamp format) can be supported in OWAMP. The control-client and server can negotiate which timestamp format will be used in test packets based on the exchange of Server Greeting message and Set-Up-Response message. This is in contrast to traditional OWAMP described in RFC 4656, which only supports a single timestamp format (i.e., NTP timestamp format). The ability to use PTPv2 timestamp format without converting to NTP timestamp format simplifies hardware solutions while preserving existing operational measurement methods. Moreover, the process is interoperable with traditional OWAMP such that a node that implements the multiple timestamp format extension can establish test sessions with a node that does not implement the extension and still arrive at a consistent decision on which timestamp format to use.

Figure 4:
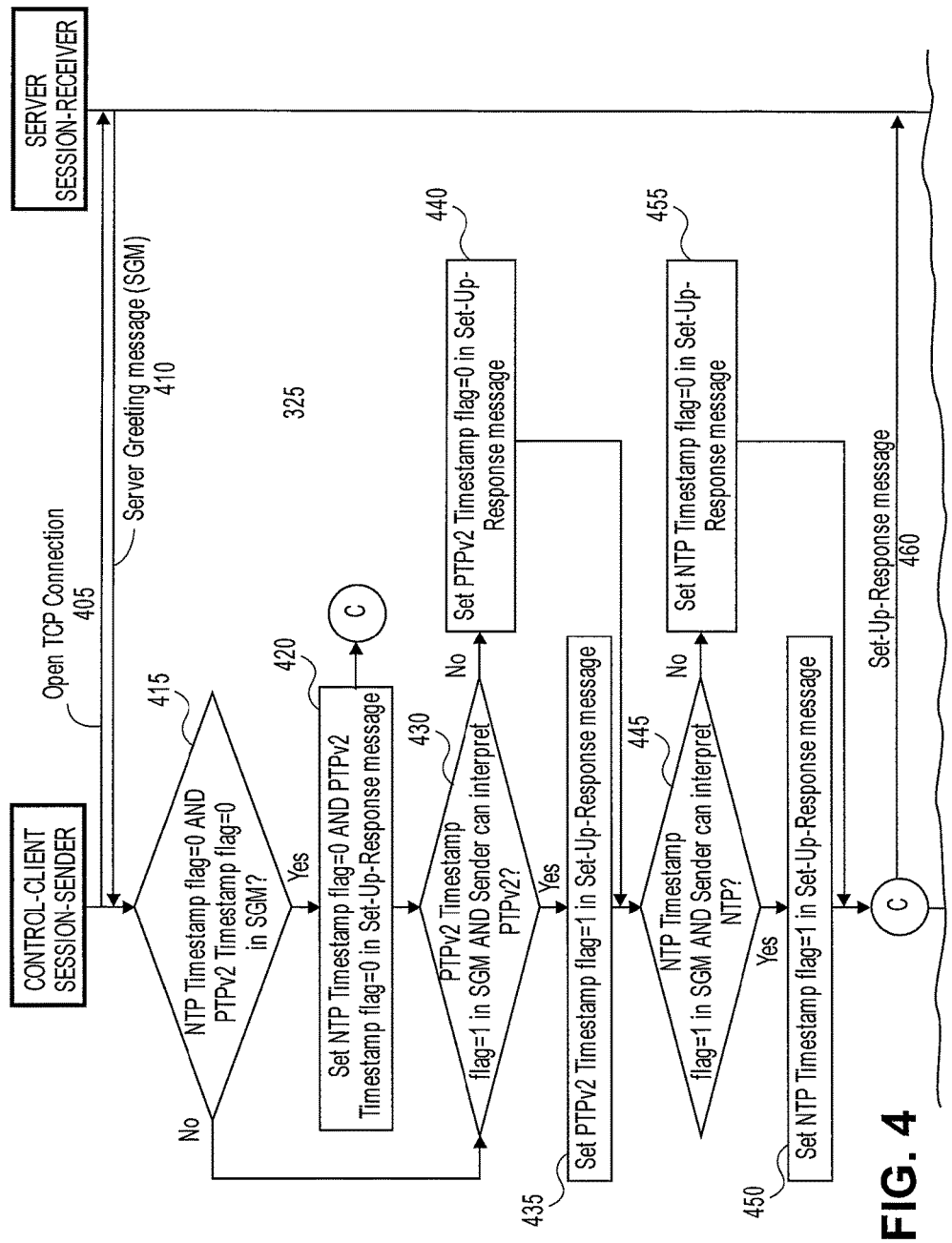
FIG. 4 is a transactional diagram showing TWAMP-Control and TWAMP-Test messages exchanged between a control-client/session-sender and a server/session-reflector for establishing and conducting a two-way active network performance measurement test session that supports multiple timestamp formats.
Figure 4:
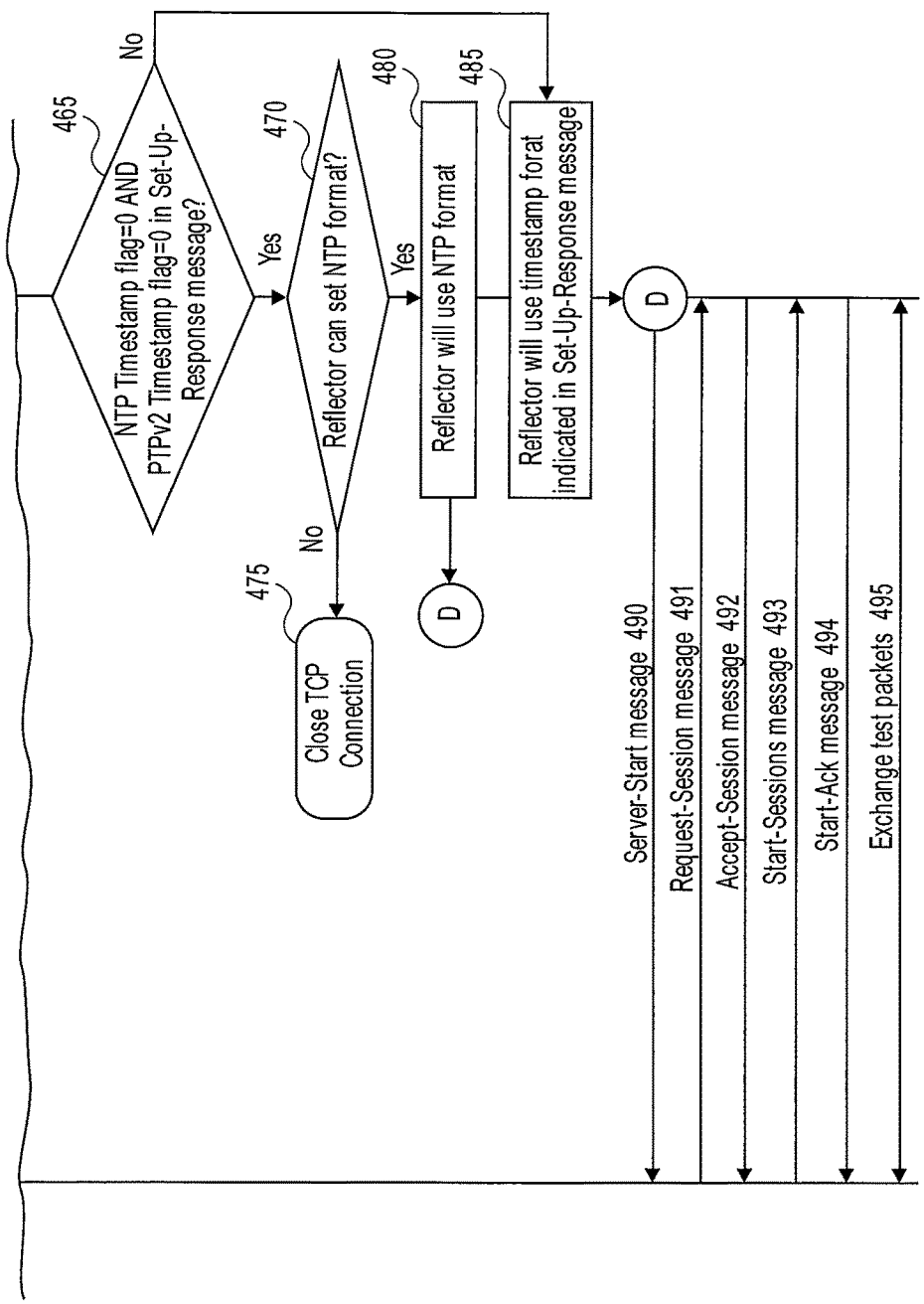

FIG. 4 is a transactional diagram showing TWAMP-Control and TWAMP-Test messages exchanged between a control-client/session-sender and a server/session-reflector for establishing and conducting a two-way active network performance measurement test session that supports multiple timestamp formats. The operations in the transactional diagram will be described with reference to the exemplary embodiments of the other figures. However, it should be understood that the operations of the transactional diagrams can be performed by embodiments of the invention other than those discussed with reference to the other figures, and the embodiments of the invention discussed with reference to these other figures can perform operations different than those discussed with reference to the transactional diagrams.

In one embodiment, the control-client initiates the TWAMP-Control protocol by opening a TCP connection to the server (405) on a previously agreed port number on which the server is listening. For example, IRNA has allocated TCP port number 862 for the TWAMP-Control portion of TWAMP. One having ordinary skill in the art will appreciate that other previously agreed upon port numbers (i.e., other than 862) can be used to establish a TCP connection to the server.

The server responds to the control-client with a Server Greeting message (410). In TWAMP-Test, the session-sender interprets timestamps set by the session-reflector. Thus, in one embodiment, the server indicates within the Server Greeting Message the timestamp formats that the session-reflector can set. In one embodiment, the Modes field of the Server Greeting message can be used to indicate the timestamp formats that the session-reflector can set. The Modes field in the Server Greeting message includes bits that are used to identify specific communication capabilities. At the same time, the Modes field includes unused bits that are available for protocol extensions. In an embodiment that supports two types of timestamp formats (e.g., NTP format and PTPv2 format), two different bits within the Modes field of the Server Greeting message are used to indicate which timestamp formats the session-reflector can set. For example, the Modes field can include a bit to indicate whether the session-reflector can set timestamps in NTP timestamp format. The bit that indicates whether the session-reflector can set timestamps in NTP timestamp format will be referred to herein as the NTP Timestamp flag. Similarly, the Modes field can include a bit to indicate whether the session-reflector can set timestamps in PTPv2 timestamp format. The bit that indicates whether the session-reflector can set timestamps in PTPv2 timestamp format will be referred to herein as the PTPv2 Timestamp flag. One having ordinary skill in the art will appreciate that other bit positions within the Server Greeting message may be used for the NTP Timestamp flag and PTPv2 Timestamp flag. In one embodiment, if the session-reflector can set timestamps in NTP format, then the server must set the NTP Timestamp flag in the Server Greeting message to have a value of 1. Otherwise, if the session-reflector cannot set timestamps in NTP format, then the server must set the NTP Timestamp flag in the Server Greeting message to have a value of 0. In a similar fashion, if the session-reflector can set timestamps in PTPv2 format, then the server must set the PTPv2 Timestamp flag in the Server Greeting message to have a value of 1. Otherwise, if the session-reflector cannot set timestamps in PTPv2 format, then the server must set the PTPv2 Timestamp flag in the Server Greeting message to have a value of 0. If the session-reflector does not support the extension, then both the NTP Timestamp flag and the PTPv2 Timestamp flag in the Server Greeting message are expected to have a value of 0 because they are in the Must Be Zero field.

The control-client receives the Server Greeting message and inspects the values set by the server in the Server Greeting message. In one embodiment, if both the NTP Timestamp flag and PTPv2 Timestamp flag of the received Server Greeting message have a value of 0 (decision block 415), then this indicates that the session-reflector does not support the multiple timestamp format extension and thus the session-reflector will set timestamps using NTP format. If this is the case, the control-client should set both the NTP Timestamp flag and PTPv2 Timestamp flag in the Set-Up-Response message to have a value of 0 (block 420) in accordance with traditional TWAMP described in RFC 5357 and send the Set-Up-Response message to the server (460).

Returning to decision block 415, if both the NTP Timestamp flag and PTPv2 Timestamp flag of the received Server Greeting message do not have a value of 0 (i.e., at least one of the flags has a value of 1), then this indicates that the session-reflector supports the multiple timestamp format extension. If the PTPv2 Timestamp flag of the received Server Greeting message has a value of 1 (indicating that the session-reflector can set timestamps in PTPv2 timestamp format) and the session-sender can interpret PTPv2 timestamp format (decision block 430), then the control-client must set the PTPv2 Timestamp flag in the Set-Up-Response message to have a value of 1 (block 435), indicating that the session-reflector should set timestamps using PTPv2 format. In a typical scenario, a session-sender that supports the multiple timestamp format extension is capable of interpreting both NTP timestamp format and PTPv2 timestamp format. Thus, in such a scenario, if the PTPv2 Timestamp flag of the received Server Greeting message has a value of 1, then the control-client must set the PTPv2 Timestamp flag in the Set-Up-Response message to have a value of 1. Otherwise, the PTPv2 Timestamp flag must be set to have a value of 0 (block 440). Similarly, if the NTP Timestamp flag of the received Server Greeting message has a value of 1 (indicating that the session-reflector can set timestamps in NTP timestamp format) and the session-sender can interpret NTP timestamp format (decision block 445), then the control-client must set the NTP Timestamp flag in the Set-Up-Response message to have a value of 1 (block 450), indicating that the session-reflector should set timestamps using NTP format. In a typical scenario, where the session-sender is capable of interpreting both NTP timestamp format and PTPv2 timestamp format, if the NTP Timestamp flag of the received Server Greeting message has a value of 1, then the control-client must set the NTP Timestamp flag in the Set-Up-Response message to have a value of 1. Otherwise, the NTP Timestamp flag must be set to have a value of 0 (block 455). If the session-sender does not support the multiple timestamp format extension, then both the NTP Timestamp flag and the PTPv2 Timestamp flag are expected to have a value of 0 because it is in the Must Be Zero field.

The control-client then sends the Set-Up-Response message (460) to the server and the server can inspect the values set by the control-client in the Set-Up-Response message to determine the timestamp format that the session-reflector should use when sending test packets to the session-sender. For example, if both the NTP Timestamp flag and PTPv2 Timestamp flag of the received Set-Up-Response message have a value of 0 (decision block 465), then this means that the session-sender can only interpret NTP timestamp format. The server checks whether the session-reflector can set timestamps in NTP format (decision block 470). If so, the session-reflector must set timestamps in NTP format (block 480). Otherwise, if the session-reflector cannot set timestamps in NTP format (decision block 470), then the server should close the TCP connection associated with the TWAMP-Control session (block 475).

Returning to decision block 465, if both the NTP Timestamp flag and PTPv2 Timestamp flag of the received Set-Up-Response message do not have a value of 0 (i.e., at least one of the flags has a value of 1), then this indicates that the session-sender supports the multiple timestamp format extension. The server then determines that the session-reflector should use the timestamp format indicated in the received Set-Up-Response message (block 485). As discussed above, in a typical scenario, a session-sender that supports the multiple timestamp format extension is capable of interpreting both NTP timestamp format and PTPv2 timestamp format. In such a scenario, both the NTP Timestamp flag and PTPv2 Timestamp flag may have a value of 1 in the received Set-Up-Response message. In that case, the server may prefer to choose the PTPv2 timestamp format over the NTP timestamp format since the PTPv2 timestamp format is a newer standard. In alternative embodiments, the server may prefer to choose the NTP timestamp format over the PTPv2 timestamp format.

Once the server determines the timestamp format that the session-reflector will use, the server responds with a Server-Start message (490). The Server Greeting message, Set-Up-Response message, and Server-Start message constitute the connection setup phase of TWAMP-Control. As a result of the connection setup phase described above, the session-reflector will choose to use a timestamp format that the session-sender is capable of interpreting. Moreover, the connection setup phase described above allows the entities to consistently decide on which timestamp format to use even if one of the endpoints (i.e., session-sender or session-reflector) does not support the multiple timestamp format extensions. This allows for the gradual release of the multiple timestamp format extension features without requiring all of the hosts to upgrade to the extension together.

Following the connection setup phase, the control-client can create a two-way active network performance measurement test session by issuing a Request-TW-Session message (491) to the server. The server then must respond with an Accept-Session message (492). The Accept-Session message may accept a request or refuse a request. If the control-client receives an affirmative Accept-Session message from the server, the control-client may start the execution of the requested test session by sending a Start-Sessions message (493) to the server. The server must respond with a Start-Ack message (494), which should be sent as quickly as possible.

Once the Start-Sessions message and Start-Ack messages have been exchanged between the control-client and the server, the session-sender and session-reflector are ready to exchange test packets (495) using the TWAMP-Test protocol. The TWAMP-Test protocol runs over User Datagram Protocol (UDP) and uses session-sender and session-reflector IP address and port numbers negotiated during the Request-TW-Session message exchange. The session-sender sends a stream of sender test packets to the session-reflector. The session-sender timestamps each sender test packet just before sending it to the session-reflector. The timestamp format used by the session-sender in the sender test packet is typically a local decision as the session-sender will be interpreting the timestamp and it is presumed that the session-sender is able to interpret its own timestamps. As packets are received by the session-reflector, the session-reflector will timestamp the received sender packets and transmit a response test packet to the session-sender in response to every received sender test packet. Each response test packet includes a timestamp indicating the time that the corresponding sender test packet was received. Also, prior to the transmission of the response test packet to the session-sender, the session-reflector inserts the best possible approximation of its actual sending time as a timestamp in the packet. The session-sender can use the timestamps included in the response test packet to calculate the elapsed time between sender test packet reception and response test packet transmission. In one embodiment, the session-reflector can insert a timestamp using the timestamp format chosen during TWAMP-Control, as described herein above. The session-reflector may also indicate which timestamp format is being used in the test packet itself. In one embodiment, the Z field in the Error Estimate field of the test packet is used to indicate the timestamp format being used. For example, a value of 0 in the Z field may indicate that NTP timestamp format is being used and a value of 1 in the Z field may indicate that PTPv2 timestamp format is being used. The use of the Z field should not affect the error estimate or the synchronization information provided in the Error Estimate field. As such, the Error Estimate field can still be used to calculate delay and delay variation metrics. One having ordinary skill in the art will appreciate that other available bits (other than the bit in the Z field) within the test packet can be used to indicate the timestamp format being used.

In TWAMP Light mode, which does not use TWAMP-Control, the decision of which timestamp format to use can be configured by a separate configuration process, configured manually by an operator, or similar mechanism, according to the capabilities of the session-sender and session-reflector.

As a result of the process described above, multiple timestamp formats (e.g., NTP timestamp format and PTPv2 timestamp format) can be supported in TWAMP. The control-client and server can negotiate which timestamp format will be used in test packets based on the exchange of Server Greeting message and Set-Up-Response message. This is in contrast to traditional TWAMP described in RFC 5357, which only supports a single timestamp format (i.e., NTP timestamp format). The ability to use PTPv2 timestamp format without converting to NTP timestamp format simplifies hardware solutions while preserving existing operational measurement methods. Moreover, the process is interoperable with traditional TWAMP such that a node that implements the multiple timestamp format extension can establish test sessions with a node that does not implement the extension and still arrive at a consistent decision on which timestamp format to use.

Figure 5:
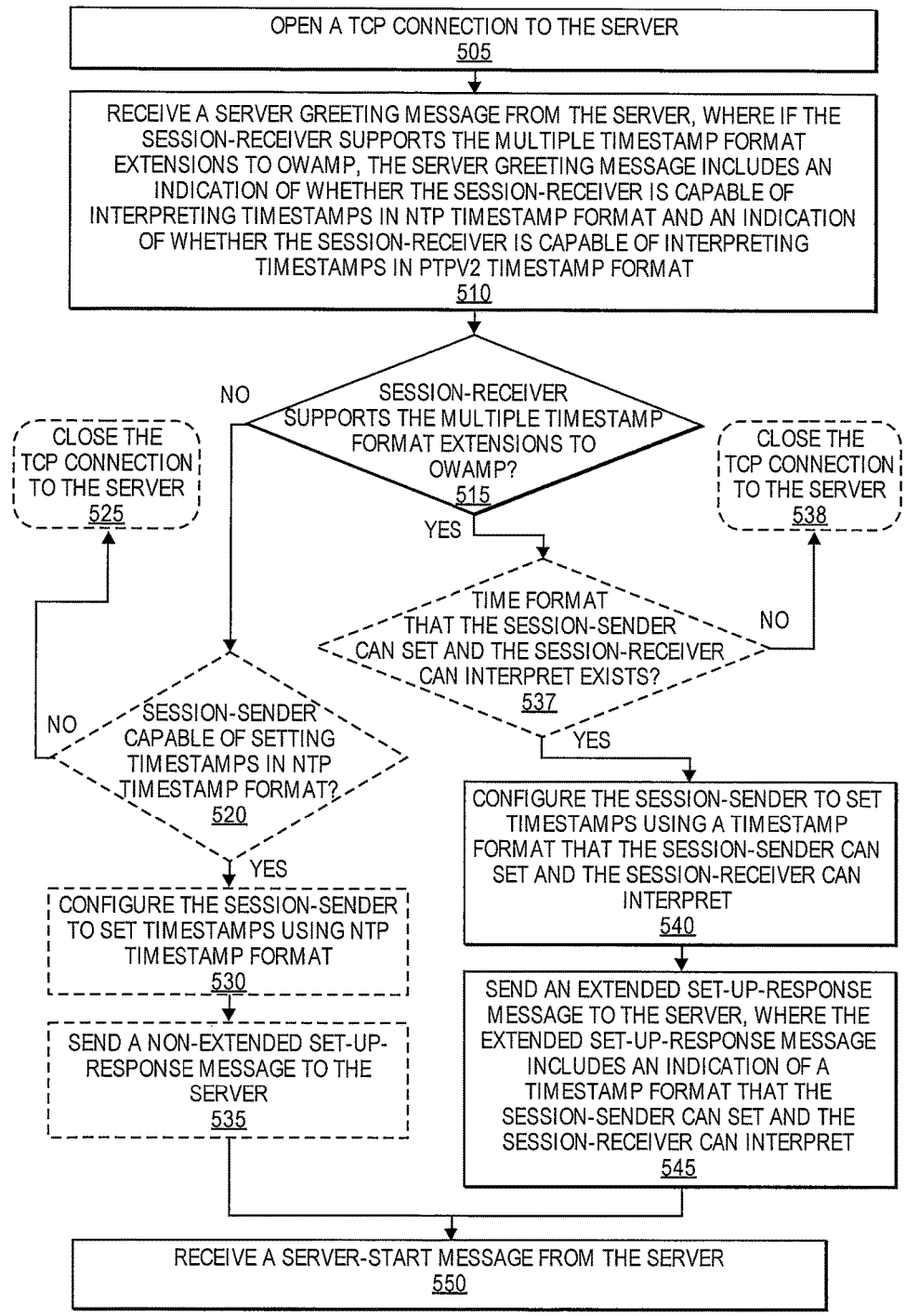
FIG. 5 is a flow diagram of one embodiment of a connection setup process for establishing a one-way active network performance measurement test session that supports multiple timestamp formats, from the perspective of a control-client.

FIG. 5 is a flow diagram of one embodiment of a connection setup process for establishing a one-way active network performance measurement test session that supports multiple timestamp formats, from the perspective of a control-client. In one embodiment, the operations of the flow diagram may be performed by a network device acting as a control-client in OWAMP. The operations of the flow diagram generalize some of the operations described with reference to the transactional diagram shown in FIG. 3. The control-client may interact with a server to configure test sessions between a session-sender and a session-receiver. In one embodiment, the process is initiated by the control-client opening a TCP connection to the server (block 505). The control-client receives a Server Greeting message from the server (block 510). If the session-receiver supports the multiple timestamp format extensions to OWAMP, the Server Greeting message includes an indication of whether the session-receiver is capable of interpreting timestamps in NTP timestamp format and an indication of whether the session-receiver is capable of interpreting timestamps in PTPv2 timestamp format. The control-client checks whether the session-receiver supports the multiple timestamp format extensions to OWAMP (decision block 515). If the session-receiver does not support the multiple timestamp format extensions to OWAMP, then the control-client checks whether the session-sender is capable of setting timestamps in NTP timestamp format (decision block 520). If the session-sender is not capable of setting timestamps in NTP timestamp format, then the control-client closes the TCP connection to the server (block 525). Returning to decision block 520, if the session-receiver is capable of setting timestamps in NTP timestamp format, then the control-client configures the session-sender to set timestamps using NTP timestamp format (block 530). The control-client then sends a non-extended Set-Up-Response message to the server (block 535). The non-extended Set-Up-Response message is a Set-Up-Response message that conforms to traditional OWAMP (i.e., without the multiple timestamp format extensions described herein). Returning to decision block 515, if the session-receiver supports the multiple timestamp format extensions to OWAMP, then the control-client checks whether a time format that the session-sender can set and the session-receiver can interpret exists (decision block 537). If so, then the control-client configures the session-sender to set timestamps using a timestamp format that the session-sender can set and the session-receiver can interpret (block 540). The control-client then sends an extended Set-Up-Response message to the server (block 545). The extended Set-Up-Response message includes an indication of a timestamp format that the session-sender can set and the session-receiver can interpret. Returning to decision block 537, if a timestamp format that the session-sender can set and the session-receiver can interpret does not exist, then the control-client closes the TCP connection to the server (block 538). After sending the Set-Up-Response message to the server (either non-extended or extended Set-Up-Response message), the control-client receives a Server-Start message from the server (block 550), which completes the connection setup phase of OWAMP-Control.

Figure 6:
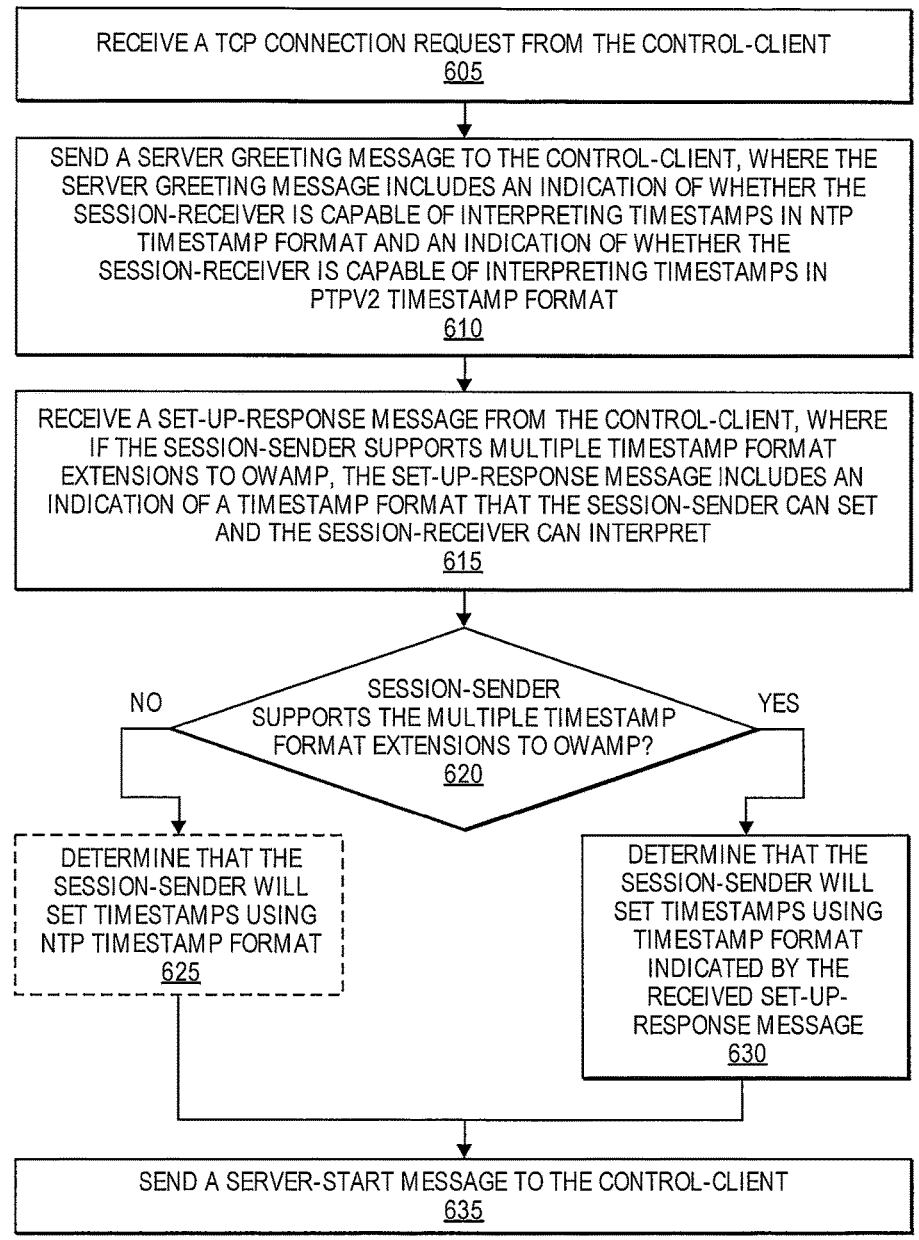
FIG. 6 is a flow diagram of one embodiment of a connection setup process for establishing a one-way active network performance measurement test session that supports multiple timestamp formats, from the perspective of a server.

FIG. 6 is a flow diagram of one embodiment of a connection setup process for establishing a one-way active network performance measurement test session that supports multiple timestamp formats, from the perspective of a server. In one embodiment, the operations of the flow diagram may be performed by a network device acting as a server in OWAMP. The operations of the flow diagram generalize some of the operations described with reference to the transactional diagram shown in FIG. 3. The server may interact with a control-client to configure test sessions between a session-sender and a session-receiver. In one embodiment, the process is initiated by the server receiving a TCP connection request from the control-client (block 605). The server sends a Server Greeting message to the control-client (block 610). The Server Greeting message includes an indication of whether the session-receiver is capable of interpreting timestamps in NTP timestamp format and an indication of whether the session-receiver is capable of interpreting timestamps in PTPv2 timestamp format. The server receives a Set-Up-Response message from the control-client (block 615). If the session-sender supports the multiple timestamp format extensions to OWAMP, the Set-Up-Response message includes an indication of a timestamp format that the session-sender can set and the session-receiver can interpret. The server checks whether the session-sender supports the multiple timestamp format extensions to OWAMP (decision block 620). If the session-sender does not support the multiple timestamp format extensions to OWAMP, then the server determines that the session-sender will set timestamps using NTP timestamp format (block 625). Otherwise, if the session-receiver supports the multiple timestamp format extensions to OWAMP, then the server determines that the session-sender will set timestamps using the timestamp format indicated by the received Set-Up-Response message (block 630). The server sends a Server-Start message to the control-client (block 635), to complete the connection setup phase of OWAMP-Control.

Figure 7:
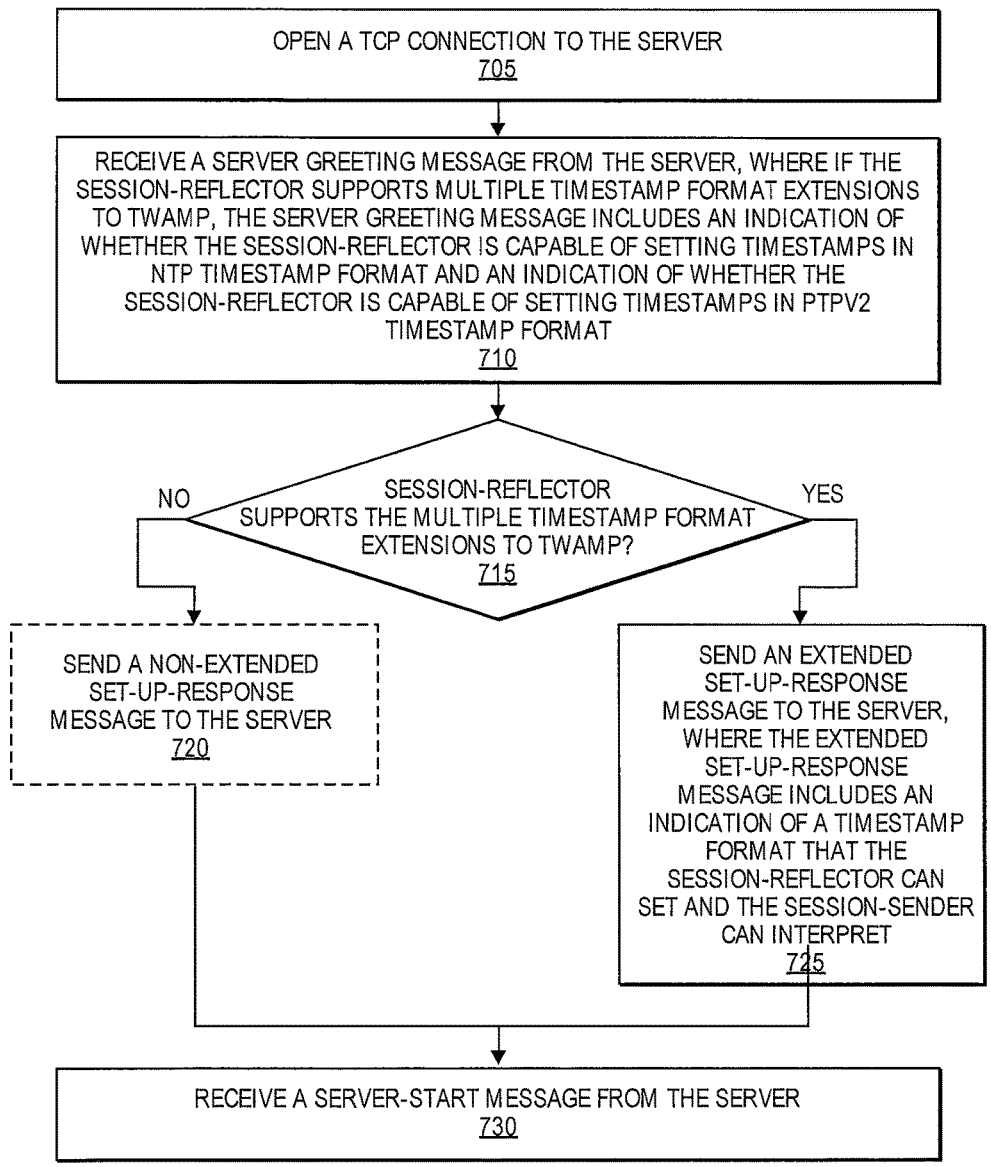
FIG. 7 is a flow diagram of one embodiment of a connection setup process for establishing a two-way active network performance measurement test session that supports multiple timestamp formats, from the perspective of a control-client.

FIG. 7 is a flow diagram of one embodiment of a connection setup process for establishing a two-way active network performance measurement test session that supports multiple timestamp formats, from the perspective of a control-client. In one embodiment, the operations of the flow diagram may be performed by a network device acting as a control-client in TWAMP. The operations of the flow diagram generalize some of the operations described with reference to the transactional diagram shown in FIG. 4. The control-client may interact with a server to configure test sessions between a session-sender and a session-reflector. In one embodiment, the process is initiated by the control-client opening a TCP connection to the server (block 705). The control-client receives a Server Greeting message from the server (block 710). If the session-reflector supports the multiple timestamp format extensions to TWAMP, the Server Greeting message includes an indication of whether the session-reflector is capable of setting timestamps in NTP timestamp format and an indication of whether the session-reflector is capable of setting timestamps in PTPv2 timestamp format. The control-client checks whether the session-reflector supports the multiple timestamp format extensions to TWAMP (decision block 715). If the session-reflector does not support the multiple timestamp format extensions to TWAMP, then the control-client sends a non-extended Set-Up-Response message to the server (block 720). The non-extended Set-Up-Response message is a Set-Up-Response message that conforms to traditional TWAMP (i.e., without the multiple timestamp format extensions described herein). Otherwise, if the session-reflector supports the multiple timestamp format extensions to TWAMP, then the control-client sends an extended Set-Up-Response message to the server (block 725). The extended Set-Up-Response message includes an indication of a timestamp format that the session-reflector can set and the session-sender can interpret. After sending the Set-Up-Response message to the server (either non-extended or extended Set-Up-Response message), the control-client receives a Server-Start message from the server (block 730), which completes the connection setup phase of TWAMP-Control.

Figure 8:
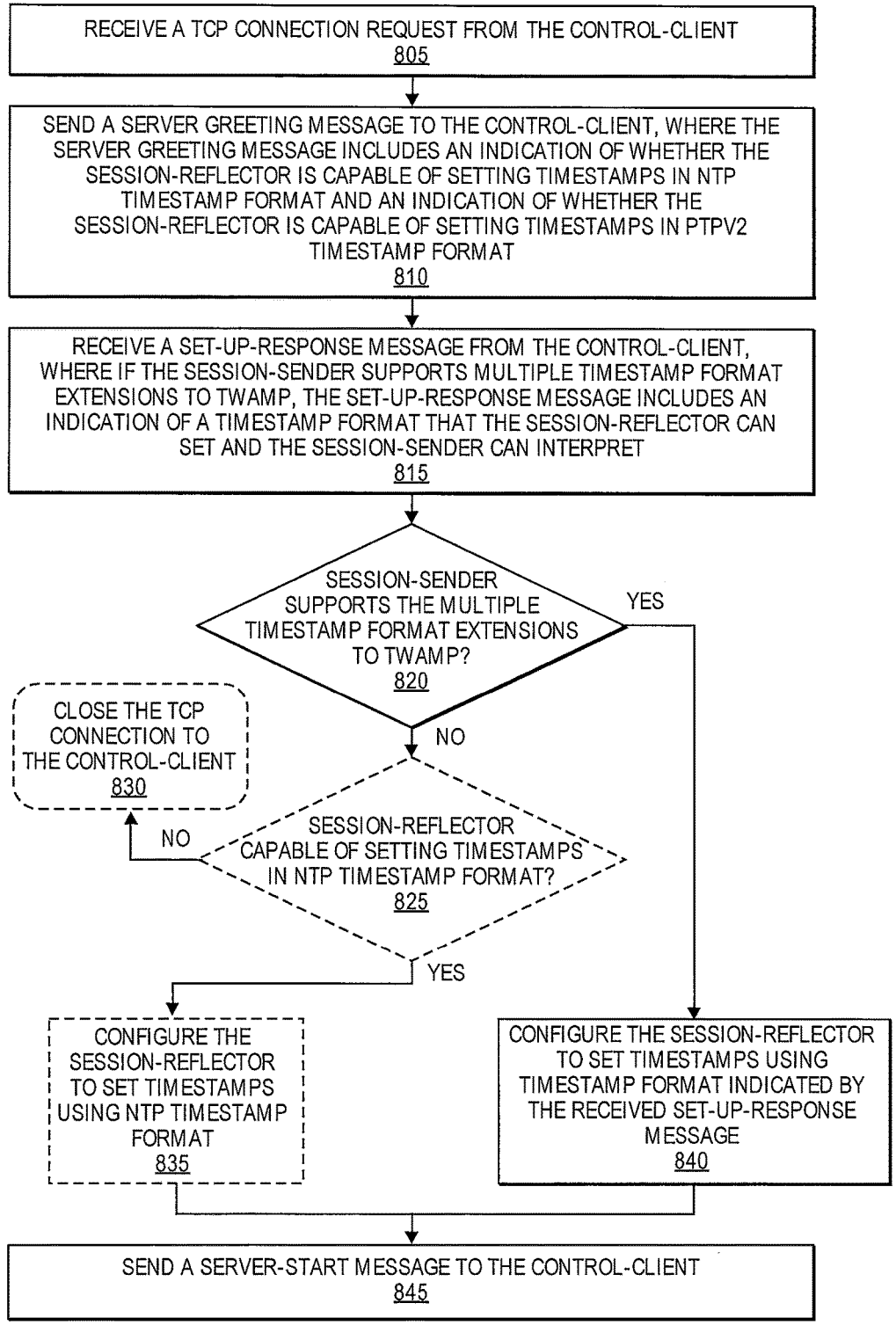
FIG. 8 is a flow diagram of one embodiment of a connection setup process for establishing a two-way active network performance measurement test session that supports multiple timestamp formats, from the perspective of a server.

FIG. 8 is a flow diagram of one embodiment of a connection setup process for establishing a two-way active network performance measurement test session that supports multiple timestamp formats, from the perspective of a server. In one embodiment, the operations of the flow diagram may be performed by a network device acting as a server in TWAMP. The operations of the flow diagram generalize some of the operations described with reference to the transactional diagram shown in FIG. 4. The server may interact with a control-client to configure test sessions between a session-sender and a session-reflector. In one embodiment, the process is initiated by the server receiving a TCP connection request from the control-client (block 805). The server sends a Server Greeting message to the control-client (block 810). The Server Greeting message includes an indication of whether the session-reflector is capable of setting timestamps in NTP timestamp format and an indication of whether the session-reflector is capable of setting timestamps in PTPv2 timestamp format. The server receives a Set-Up-Response message from the control-client (block 815). If the session-sender supports the multiple timestamp format extensions to TWAMP, the Set-Up-Response message includes an indication of a timestamp format that the session-reflector can set and the session-sender can interpret. The server checks whether the session-sender supports the multiple timestamp format extensions to TWAMP (decision block 820). If the session-sender does not support the multiple timestamp format extensions to TWAMP, then the server checks whether the session-reflector is capable of setting timestamps in NTP timestamp format (decision block 825). If the session-reflector is not capable of setting timestamps in NTP timestamp format, then the server closes the TCP connection to the control-client (block 830). If the session-reflector is capable of setting timestamps in NTP timestamp format, then the server configures the session-reflector to set timestamps using NTP timestamp format (block 835). Returning to decision block 820, if the session-sender supports the multiple timestamp format extensions to TWAMP, then the server configures the session-reflector to set timestamps using the timestamp format indicated by the received Set-Up-Response message (block 840). The server sends a Server-Start message to the control-client (block 845), to complete the connection setup phase of TWAMP-Control.

Figure 9:
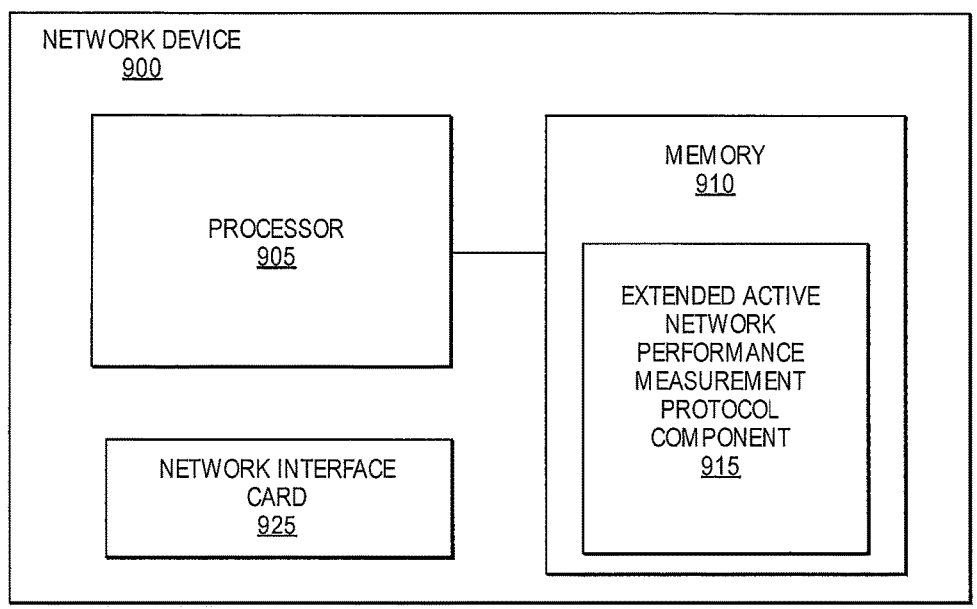
FIG. 9 is a block diagram of one embodiment of a network device that can implement an active network performance measurement protocol that supports multiple timestamp formats.

FIG. 9 is a block diagram of one embodiment of a network device that can implement an active network performance measurement protocol that supports multiple timestamp formats. The network device 900 can perform some or all of the operations and methods described above for one or more of the embodiments. One having ordinary skill in the art will understand that the network device 900 is provided by way of example rather than limitation, and that other network devices with differing configurations can implement some or all of the operations and methods described above for one or more of the embodiments. In the example embodiment, the network device 900 includes one or more processor(s) 905, memory 910, network interface controllers 925 (NICs; also known as network interface cards), and an extended active network performance measurement protocol component 915. The network device 900 may act as a control-client/session-sender and/or a server/session-receiver/reflector in an active network performance measurement test session.

The processor(s) 905 may include one or more data processing circuits, such as a general purpose and/or special purpose processor (e.g., microprocessor and/or digital signal processor). The processor(s) 905 is adapted to execute the extended active network performance measurement protocol component 915 to perform some or all of the operations and methods described above for one or more of the embodiments, such as the embodiments of FIGS. 3-8.

In one embodiment, the processor(s) 905 is coupled to a memory 910 such as read-only memory (ROM), flash memory, dynamic random access memory (DRAM), magnetic disks, optical disks, phase change memory, or any type of non-transitory machine-readable media to store code for execution on the processor(s) 905 and/or to store data. The extended active network performance measurement protocol component 915 can be stored in memory 910 and executed by the processor 905 to perform some or all of the operations and methods described above for one or more of the embodiments. In one embodiment, the extended active network performance measurement protocol component 915 implements the multiple timestamp format extensions to OWAMP-Control and/or OWAMP-Test described herein above. In one embodiment, the extended active network performance measurement protocol component 915 implements the multiple timestamp format extensions to TWAMP-Control and/or TWAMP-Test described herein above. In one embodiment, the extended active network performance measurement protocol component 915 implements functionality performed by the control-client and/or session-sender. In one embodiment, the extended active network performance measurement protocol component 915 implements functionality performed by the server and/or session-receiver/reflector. In some embodiments, the network device 900 can act as a control-client/session-sender for some test sessions, while acting as a server/session-receiver/reflector in other test sessions. In such embodiments, the extended active network performance measurement protocol component 915 may implement both the control-client/session-sender functionality and server/session-receiver/reflector functionality. Thus, the functions of the extended active network performance measurement protocol component 915 that are executed and implemented by the networking device 900 can include those described further herein above.

The network device 900 includes a set of one or more NICs 925 (which include physical network interface(s)) to establish network connections (to transmit and/or receive code and/or data using propagating signals) with other network devices over a network. For example, the network device 900 may establish network connections with other network devices to establish and conduct active network performance measurement test sessions over network segments according to embodiments described herein.

Figure 10A:
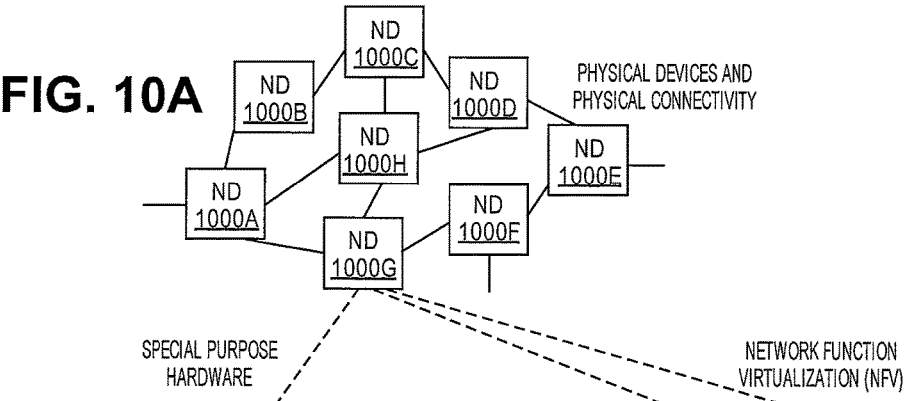
FIG. 10A illustrates connectivity between network devices (NDs) within an exemplary network, as well as three exemplary implementations of the NDs, according to some embodiments of the invention.

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1000A, E, and F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a proprietary operating system (OS); and 2) a general purpose network device 1004 that uses common off-the-shelf (COTS) processors and a standard OS.

The special-purpose network device 1002 includes networking hardware 1010 comprising compute resource(s) 1012 (which typically include a set of one or more processors), forwarding resource(s) 1014 (which typically include one or more ASICs and/or network processors), and physical network interfaces (NIs) 1016 (sometimes called physical ports), as well as non-transitory machine readable storage media 1018 having stored therein networking software 1020. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1000A-H. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A). In one embodiment, an extended active network performance measurement protocol component (e.g., 1033A and 1033R) implements some of the processes described herein above as part of the networking software, which may be loaded and stored in the non-transitory machine readable media 1018 or in a similar location. In one embodiment, the extended active network performance measurement protocol component (e.g., 1033A and 1033R) implements functionality performed by any of the control-client, server, session-sender, and/or session-receiver/reflector for either OWAMP or TWAMP, as described herein to support multiple timestamp formats.

The special-purpose network device 1002 is often physically and/or logically considered to include: 1) a ND control plane 1024 (sometimes referred to as a control plane) comprising the compute resource(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the compute resource(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
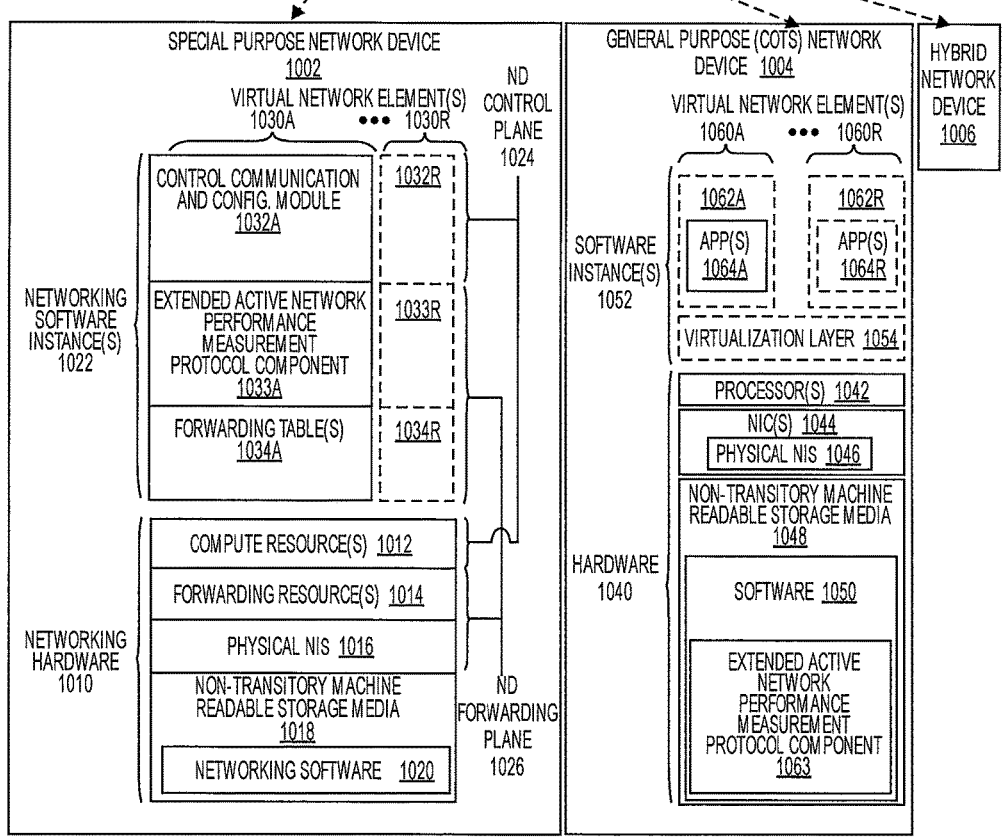
FIG. 10B illustrates an exemplary way to implement a special-purpose network device according to some embodiments of the invention.
Figure 10B:
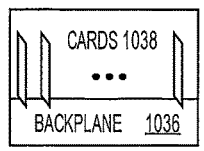

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein software 1050. Software 1050 may include an extended active network performance measurement protocol component 1063 that implements the processes described herein above. In one embodiment, the extended active network performance measurement protocol component 1063A implements functionality performed by any of the control-client, server, session-sender, and/or session-receiver/reflector for either OWAMP or TWAMP, as described herein to support multiple timestamp formats. During operation, the processor(s) 1042 execute the software 1050 to instantiate one or more sets of one or more applications 1064A-R. While one embodiment does not implement virtualization, alternative embodiments may use different forms of virtualization—represented by a virtualization layer 1054 and software containers 1062A-R. For example, one such alternative embodiment implements operating system-level virtualization, in which case the virtualization layer 1054 represents the kernel of an operating system (or a shim executing on a base operating system) that allows for the creation of multiple software containers 1062A-R that may each be used to execute one of the sets of applications 1064A-R. In this embodiment, the multiple software containers 1062A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1054 represents a hypervisor (sometimes referred to as a virtual machine monitor (VMM)) or a hypervisor executing on top of a host operating system; and 2) the software containers 1062A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1064A-R, as well as the virtualization layer 1054 and software containers 1062A-R if implemented, are collectively referred to as software instance(s) 1052. Each set of applications 1064A-R, corresponding software container 1062A-R if implemented, and that part of the hardware 1040 that executes them (be it hardware dedicated to that execution and/or time slices of hardware temporally shared by software containers 1062A-R), forms a separate virtual network element(s) 1060A-R. In one embodiment, the software containers 562A-R may execute the described extended active network performance measurement protocol component 1063 and related software described herein above.

The virtual network element(s) 1060A-R perform similar functionality to the virtual network element(s) 1030A-R— e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1062A-R differently. For example, while embodiments of the invention are illustrated with each software container 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1062A-R to VNEs also apply to embodiments where such a finer level of granularity is used.

In certain embodiments, the virtualization layer 1054 includes a virtual switch that provides similar forwarding services as a physical Ethernet switch. Specifically, this virtual switch forwards traffic between software containers 1062A-R and the NIC(s) 1044, as well as optionally between the software containers 1062A-R; in addition, this virtual switch may enforce network isolation between the VNEs 1060A-R that by policy are not permitted to communicate with each other (e.g., by honoring virtual local area networks (VLANs)).

The third exemplary ND implementation in FIG. 10A is a hybrid network device 1006, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 10C illustrates various exemplary ways in which VNEs may be coupled according to some embodiments of the invention. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software containers 1062A-R may operate as servers; the same would be true for the hybrid network device 1006; in the case of the special-purpose network device 1002, one or more such servers could also be run on a virtualization layer executed by the compute resource(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 1070A-H (e.g., the compute resource(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs. In one embodiment, the centralized control plane 1076 includes an extended active network performance measurement protocol component 1081 that implements functionality of the control-client and/or the server to configure a session-sender and/or session-receiver via south bound interface 1082 to conduct OWAMP and/or TWAMP test sessions that support multiple timestamp formats, as described herein. It is to be noted that the active network performance measurement protocol component 1081 is provided by way of example and not limitation, and that in some embodiments, functionality of other logical entities such as the session-sender and session-receiver/reflector may be implemented by the extended active network performance measurement protocol component 1081. In some embodiments, the extended active network performance measurement protocol component 1081 may be implemented as part of the application layer 1086.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the compute resource(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments of the invention, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments of the invention, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general purpose network device 1004 or hybrid network device 1006 implementations as NFV is able to support SDN by providing an infrastructure upon which the SDN software can be run, and NFV and SDN both aim to make use of commodity server hardware and physical switches.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments of the invention. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1074, but may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 10701 in one of the virtual network(s) 1092 of FIG. 10D, according to some embodiments of the invention. FIG. 10E shows that in this virtual network, the NE 10701 is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments of the invention. Thus, the abstraction of a NE or VNE can span multiple NDs.

While some embodiments of the invention implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Figure 11:
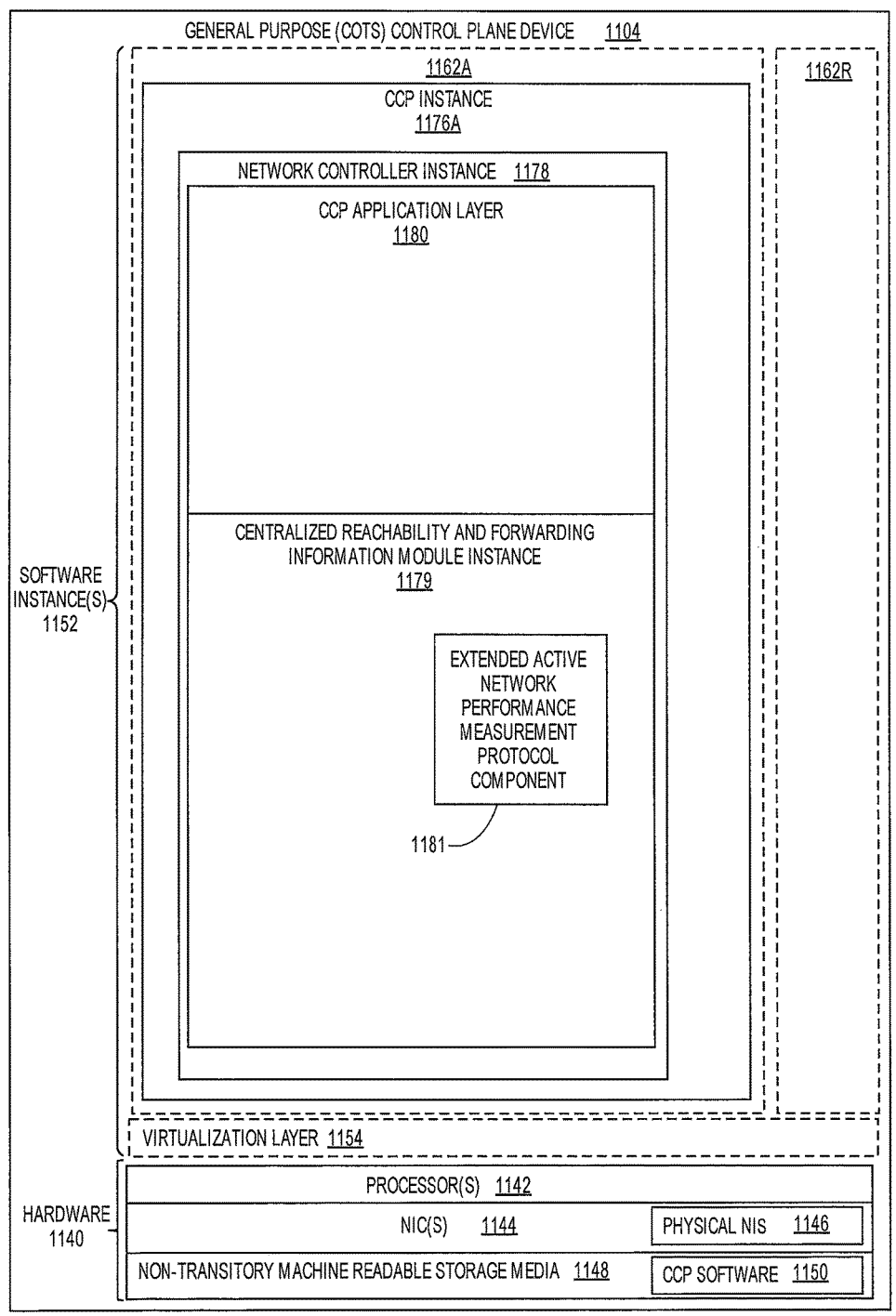
FIG. 11 illustrates a general purpose control plane device with centralized control plane (CCP) software 1150), according to some embodiments of the invention.

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 11 illustrates, a general purpose control plane device 1104 including hardware 1140 comprising a set of one or more processor(s) 1142 (which are often COTS processors) and network interface controller(s) 1144 (NICs; also known as network interface cards) (which include physical NIs 1146), as well as non-transitory machine readable storage media 1148 having stored therein centralized control plane (CCP) software 1150.

In embodiments that use compute virtualization, the processor(s) 1142 typically execute software to instantiate a virtualization layer 1154 and software container(s) 1162A-R (e.g., with operating system-level virtualization, the virtualization layer 1154 represents the kernel of an operating system (or a shim executing on a base operating system) that allows for the creation of multiple software containers 1162A-R (representing separate user space instances and also called virtualization engines, virtual private servers, or jails) that may each be used to execute a set of one or more applications; with full virtualization, the virtualization layer 1154 represents a hypervisor (sometimes referred to as a virtual machine monitor (VMM)) or a hypervisor executing on top of a host operating system, and the software containers 1162A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1150 (illustrated as CCP instance 1176A) is executed within the software container 1162A on the virtualization layer 1154. In embodiments where compute virtualization is not used, the CCP instance 1176A on top of a host operating system is executed on the "bare metal" general purpose control plane device 1104. The instantiation of the CCP instance 1176A, as well as the virtualization layer 1154 and software containers 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1078 to the operating system and communicating with the various NE5), and an CCP application layer 1180 (sometimes referred to as an application layer) over the middleware layer (providing the intelligence required for various network operations such as protocols, network situational awareness, and user—interfaces). At a more abstract level, this CCP application layer 1180 within the centralized control plane 1076 works with virtual network view(s) (logical view(s) of the network) and the middleware layer provides the conversion from the virtual networks to the physical view. In one embodiment, the centralized reachability and forwarding information module instance 1179 includes an extended active network performance measurement protocol component 1181 that implements functionality of the control-client and/or the server to configure a session-sender and/or session-receiver to manage OWAMP and/or TWAMP test sessions that support multiple timestamp formats, as described herein. It is to be noted that the active network performance measurement protocol component 1181 is provided by way of example and not limitation, and that in some embodiments, functionality of other logical entities such as the session-sender and session-receiver/reflector may be implemented by the extended active network performance measurement protocol component 1181. In some embodiments, the extended active network performance measurement protocol component 1181 may be implemented as part of the CCP application layer 1180.

The centralized control plane 1076 transmits relevant messages to the data plane 1080 based on CCP application layer 1180 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 1080 may receive different messages, and thus different forwarding information. The data plane 1080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 1076. The centralized control plane 1076 will then program forwarding table entries into the data plane 1080 to accommodate packets belonging to the flow of the unknown packet. Once a specific forwarding table entry has been programmed into the data plane 1080 by the centralized control plane 1076, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the descriptions provided herein. The description is thus to be regarded as illustrative instead of limiting.

The invention claimed is:

1. A method implemented by a network device to establish a one-way active measurement protocol (OWAMP) test session that supports use of a Network Time Protocol (NTP) timestamp format and a Precision Time Protocol Version 2 (PTPv2) timestamp format, the network device acting as a control-client that communicates with a server to establish an OWAMP test session between a session-sender and a session-receiver, the method comprising:
   opening a transmission control protocol (TCP) connection to the server;
   receiving a server greeting message from the server, wherein the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP;
   determining whether the session-receiver supports the multiple timestamp format extensions to OWAMP;
   configuring the session-sender to set timestamps using a timestamp format that the session-sender can set and the session-receiver can interpret in response to determining that the session-receiver supports the multiple timestamp format extensions to OWAMP;
   sending an extended set-up-response message to the server in response to determining that the session-receiver supports the multiple timestamp format extensions to OWAMP, wherein the extended set-up-response message includes a PTPv2 timestamp flag with a first value and a NTP timestamp with a second value, and wherein both the first value and the second value are modified based on determining that the session-receiver supports the multiple timestamp format extensions to OWAMP; and
   receiving a server-start message from the server.

2. The method of claim 1, further comprising:
   configuring the session-sender to set the timestamps using the NTP timestamp format in response to determining that the session-receiver does not support the multiple timestamp format extensions to OWAMP and the session-sender is capable of setting timestamps in the NTP timestamp format.

3. The method of claim 1, further comprising:
   closing the TCP connection with the server in response to determining that the session-receiver does not support the multiple timestamp format extensions to OWAMP and the session-sender is not capable of setting timestamps in the NTP timestamp format.

4. The method of claim 1, further comprising:
   sending a non-extended set-up-response message to the server in response to determining that the session-receiver does not support the multiple timestamp format extensions to OWAMP.

5. The method of claim 1, further comprising:
   closing the TCP connection with the server in response to determining that a timestamp format that the session-sender can set and the session-receiver can interpret does not exist.

6. A network device configured to establish a one-way active measurement protocol (OWAMP) test session that supports use of a Network Time Protocol (NTP) timestamp format and a Precision Time Protocol Version 2 (PTPv2) timestamp format, the network device to act as a control-client that communicates with a server to establish an OWAMP test session between a session-sender and a session-receiver, the network device comprising:
   a non-transitory machine readable medium to store an extended active network performance measurement protocol component; and
   a processor communicatively coupled to the non-transitory machine readable medium, the processor configured to execute the extended active network performance measurement protocol component, the extended active network performance measurement protocol component configured to open a transmission control protocol (TCP) connection to the server, receive a server greeting message from the server, wherein the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP, determine whether the session-receiver supports the multiple timestamp format extensions to OWAMP, configure the session-sender to set timestamps using a timestamp format that the session-sender can set and the session-receiver can interpret in response to determining that the session-receiver supports the multiple timestamp format extensions to OWAMP, send an extended set-up-response message to the server in response to determining that the session-receiver supports the multiple timestamp format extensions to OWAMP, wherein the extended set-up-response message includes a PTPv2 timestamp flag with a first value and a NTP timestamp with a second value, and wherein both the first value and the second value are modified based on determining that the session-receiver supports the multiple timestamp format extensions to OWAMP, and receive a server-start message from the server.

7. A non-transitory machine readable storage medium having stored therein instructions to be executed by a network device to establish a one-way active measurement protocol (OWAMP) test session that supports use of a Network Time Protocol (NTP) timestamp format and a Precision Time Protocol Version 2 (PTPv2) timestamp format, the network device to act as a control-client that communicates with a server to establish an OWAMP test session between a session-sender and a session-receiver, the instructions when executed by the network device cause the network device to perform a set of operations comprising:

opening a transmission control protocol (TCP) connection to the server;

receiving a server greeting message from the server, wherein the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP;

determining whether the session-receiver supports the multiple timestamp format extension to OWAMP;

configuring the session-sender to set timestamps using a timestamp format that the session-sender can set and the session-receiver can interpret in response to determining that the session-receiver supports the multiple timestamp format extensions to OWAMP;

sending an extended set-up-response message to the server in response to determining that the session-receiver supports the multiple timestamp format extensions to OWAMP, wherein the extended set-up-response message includes a PTPv2 timestamp flag with a first value and a NTP timestamp with a second value, and wherein both the first value and the second value are modified based on determining that the session-receiver supports the multiple timestamp format extensions to OWAMP; and receiving a server-start message from the server.

8. The non-transitory machine readable storage medium of claim 7, wherein the instructions when executed by the network device cause the network device to perform a further set of operations comprising:

configuring the session-sender to set timestamps using the NTP timestamp format in response to determining that the session-receiver does not support the multiple timestamp format extensions to OWAMP and the session-sender is capable of setting timestamps in the NTP timestamp format.

9. The non-transitory machine readable storage medium of claim 7, wherein the instructions when executed by the network device cause the network device to perform a further set of operations comprising:

closing the TCP connection with the server in response to determining that the session-receiver does not support the multiple timestamp format extensions to OWAMP and the session-sender is not capable of setting timestamps in the NTP timestamp format.

10. The non-transitory machine readable storage medium of claim 7, wherein the instructions when executed by the network device cause the network device to perform a further set of operations comprising:

sending a non-extended set-up-response message to the server in response to determining that the session-receiver does not support the multiple timestamp format extensions to OWAMP.

11. The non-transitory machine readable storage medium of claim 7, wherein the instructions when executed by the network device cause the network device to perform a further set of operations comprising:

closing the TCP connection with the server in response to determining that a timestamp format that the session-sender can set and the session-receiver can interpret does not exist.

12. A computing device implementing a plurality of virtual machines for implementing network function virtualization (NFV), wherein a virtual machine from the plurality of virtual machines is configured to establish a one-way active measurement protocol (OWAMP) test session that supports use of a Network Time Protocol (NTP) timestamp format and a Precision Time Protocol Version 2 (PTPv2) timestamp format, the virtual machine to implement functionality that causes the computing device to act as a control-client that communicates with a server to establish an OWAMP test session between a session-sender and a session receiver, the computing device comprising:

a non-transitory machine readable storage medium having stored therein an extended active network performance measurement protocol component; and a processor communicatively coupled to the non-transitory machine readable storage medium, the processor configured to execute the virtual machine, where the virtual machine is configured to implement the extended active network performance measurement protocol component, wherein the extended active network performance measurement protocol component is configured to open a transmission control protocol (TCP) connection to the server, receive a server greeting message from the server, wherein the server greeting message includes an indication of whether the session-receiver is capable of interpreting timestamps in the NTP timestamp format and an indication of whether the session-receiver is capable of interpreting timestamps in the PTPv2 timestamp format where the session-receiver supports multiple timestamp format extensions to OWAMP, determine whether the session-receiver supports the multiple timestamp format extensions to OWAMP, configure the session-sender to set timestamps using a timestamp format that the session-sender can set and the session-receiver can interpret in response to determining that the session-receiver supports the multiple timestamp format extensions to OWAMP, send an extended set-up-response message to the server in response to determining that the session-receiver supports the multiple timestamp format extensions to OWAMP, wherein the extended set-up-response message includes a PTPv2 timestamp flag with a first value and a NTP timestamp with a second value, and wherein both the first value and the second value are modified based on determining that the session-receiver supports the multiple timestamp format extensions to OWAMP, and receive a server-start message from the server.

* * * * *